(12) United States Patent
Fan et al.

(10) Patent No.: US 8,512,661 B2
(45) Date of Patent: Aug. 20, 2013

(54) CARBONATION CALCINATION REACTION PROCESS FOR $CO_2$ CAPTURE USING A HIGHLY REGENERABLE SORBENT

(75) Inventors: Liang-Shih Fan, Columbus, OH (US); Shwetha Ramkumar, Columbus, OH (US); William Wang, Hilliard, OH (US); Robert Statnick, Cornelius, NC (US)

(73) Assignee: The Ohio State University Research Foundation, Columbus, OH (US)

( * ) Notice: Subject to any disclaimer, the term of this patent is extended or adjusted under 35 U.S.C. 154(b) by 168 days.

(21) Appl. No.: 13/111,794

(22) Filed: May 19, 2011

(65) Prior Publication Data

US 2011/0286902 A1 Nov. 24, 2011

Related U.S. Application Data

(63) Continuation-in-part of application No. PCT/US2009/065224, filed on Nov. 19, 2009.

(60) Provisional application No. 61/116,172, filed on Nov. 19, 2008.

(51) Int. Cl.
*B01D 53/50* (2006.01)
*B01D 53/62* (2006.01)
*B01D 53/74* (2006.01)
*B01D 53/81* (2006.01)

(52) U.S. Cl.
USPC ........ 423/230; 423/242.1; 422/129; 422/162; 422/187; 422/619; 422/630; 422/634; 422/641

(58) Field of Classification Search
USPC .............. 423/230, 242.1; 422/129, 162, 187, 422/619, 630, 634, 641
See application file for complete search history.

(56) References Cited

U.S. PATENT DOCUMENTS

| | | | | |
|---|---|---|---|---|
| 7,067,456 | B2 * | 6/2006 | Fan et al. | 502/400 |
| 7,618,606 | B2 * | 11/2009 | Fan et al. | 423/230 |
| 2001/0054253 | A1 * | 12/2001 | Takahashi et al. | 47/63 |
| 2011/0158874 | A1 * | 6/2011 | Smedley et al. | 423/230 |

* cited by examiner

*Primary Examiner* — Timothy Vanoy
(74) *Attorney, Agent, or Firm* — Standley Law Group LLP

(57) ABSTRACT

A process for the efficient capture of $CO_2$ and sulfur from combustion flue gas streams and gasification based fuel gas mixtures using regenerable and recyclable calcium based sorbents. The regeneration of the calcium sorbent is accomplished by hydrating the sorbent at high temperatures of about 600° C. and a pressure higher than 6 bars to lower the parasitic energy consumption.

20 Claims, 21 Drawing Sheets

CARBONATION CALCINATION REACTION PROCESS FOR $CO_2$ CAPTURE USING A HIGHLY REGENERABLE SORBENT

CROSS-REFERENCE TO RELATED APPLICATIONS

This application is a continuation-in-part of International Application No. PCT/US2009/065224 filed Nov. 19, 2009, which claims priority to U.S. Application No. 61/116,172 filed Nov. 19, 2008, both of which are incorporated by reference herein as if fully rewritten herein.

TECHNICAL FIELD

Exemplary embodiments relate to elimination in pollutants from flue gas stream. More specifically, exemplary embodiments relate to reactivation of a sorbent for elimination of pollutants from a flue gas stream.

BACKGROUND AND SUMMARY OF THE INVENTION

The concept of utilizing lime for carbon dioxide capture has existed for well over a century. It was first introduced by DuMotay and Marechal in 1869 for enhancing the gasification of coal using lime followed by CONSOL's $CO_2$ acceptor process a century later when this concept was tested in a 40 tons/day plant. A variation of this process called the Hypring process was developed in Japan for the production of hydrogen at high pressures. Harrison et al. and Grace et al. have also applied this concept to the production of hydrogen both from Syngas by the water gas shift reaction and methane by the sorption enhanced steam methane reforming reaction. Silaban et al. studied the reversibility of the carbonation reaction for the production of hydrogen.

Within the last decade research has also focused on the use of lime for carbon dioxide capture from combustion flue gas. Shimizu et al. conceptually designed a process that uses twin-fluidized bed reactors for capturing carbon dioxide from a coal combustion power plant. After the conceptual design, a significant amount of research has advanced the concept greatly. The contribution of John R. Grace from the University of British Columbia, Juan Carlos Abanades from Instituto Nacional del Carbon-CSIC and CANMET energy Technology Centre have further enhanced the understanding of the Chemical Looping Technology using lime sorbent for the capture of $CO_2$. In addition, the reversibility of the carbonation reaction, the investigation of the decay of $CO_2$ capture over multiple cycles of carbonation and calcination and the production layer formation have been studied by Barker et al., Bhatia and Perlmutter and Mess et al. respectively.

The regenerability of the calcium oxide sorbent has been the major draw back of high temperature calcium based $CO_2$ capture processes. CaO oxide sorbents are prone to sintering during to the regeneration step which is conducted at high temperatures. Over multiple cycles sintering progressively increases and reduces the $CO_2$ capture capacity of the sorbent. Sintering results in an increase in solid circulation and make up rate. Research has been conducted to develop methods of reducing the sintering of the sorbent. Pretreatment methods have been developed at the CANMET Energy Center which involves hydration of the calcined sorbent at 100° C. at atmospheric pressure and saturation pressure, powdering the sorbent and preheating the sorbent in a nitrogen atmosphere. The sintering of the sorbent was reduced when these pretreatment methods were applied to the sorbent. This concept developed by CANMET Energy Center is only a pretreatment method and is applied to the sorbent once in 20 cycles and sorbent sintering still occurs resulting in a reduction in $CO_2$ capture capacity. This concept has been tested by Manovic et al. in TGA, fixed bed and a 75 KWth dual fluidized bed combustion plant.

Grace et al. have also investigated the pretreatment of the sorbent by hydration at atmospheric pressure at 150° C. and 300° C. From thermodynamics it is seen that complete hydration does not occur spontaneously at temperature of 300° C. and hence complete reactivation of the sorbent is not achieved by these methods. In addition, this method has also been developed to be applied once in a few cycles and hence sorbent degradation still occurs.

The reactivation of the sorbent by recarbonation has also been investigated but this process requires an additional calcination step which is very energy consuming and uneconomical.

Zeeman et al. have integrated the hydration process as a reactivation step in the $CO_2$ removal process. They hydrate the sorbent at 300° C. in the presence of $CO_2$ and steam at atmospheric pressure. There has been no mention about the extent of hydration achieved by this process and the amount of carbonation occurring during the hydration process. Although this method was found to reduce sintering and reactivate the sorbent a steady decline in the reactivity of the sorbent was still observed.

Consequently, it can be understood that there is a need for a cost effective and efficient system and method to minimize the sintering of the selected sorbent and overcome the sorbents decay in reactivity. Exemplary systems and methods of the inventive concept satisfy these needs/preferences.

SUMMARY OF THE INVENTIVE CONCEPT

Exemplary embodiments of the present invention are directed to economically feasible options for the integration of calcium sorbent based $CO_2$ capture technology in post-combustion systems, specifically in coal-fired power plants. Exemplary embodiments described herein may also be applicable for pre-combustion systems. Exemplary embodiments of the inventive concept specifically provide process integration options while factoring in such variables as location(s) of flue/fuel gas drawn for $CO_2$ capture, source of steam for the hydrator, solids purge and recycle locations, particle capture devices (PCDs), reactor configurations, heat management, and a variety of other factors.

In contrast to the above mentioned methods of sorbent reactivation. The Ohio State University has developed a process to completely reactivate the sorbent in an energy efficient manner using pressure hydration. The complete reactivation of the sorbent during every cycle reverses the effect of sintering and the history of the number of cycles is completely lost. Hence, this process minimizes the amount of solids circulation in the system. In addition, pressure hydration of the sorbent may be conducted at high temperatures of 600° C. and the exothermic energy of hydration is used to supply the endothermic energy of dehydration. In addition, pressure hydration does not require the cooling and reheating of the sorbent thereby reducing the parasitic energy consumption of the process. Extensive experiments have been conducted at the Ohio State University wherein complete regeneration of the sorbent has been observed for a number of cycles. Pressure hydration as used herein does not require saturation pressure or high pressure of operation. A pressure of above 6 bar is sufficient for a temperature of 600° C. As the temperature decreases the pressure required is also reduced. Thus, the hydration process proposed by the Ohio state University is energy efficient and economical.

Embodiments of the present invention detail a process for the efficient capture of $CO_2$ and sulfur from combustion flue gas streams and gasification based fuel gas mixtures using regenerable and recyclable calcium based sorbents. In exemplary embodiments, the solid sorbent is predominantly a metal oxide that can be converted into a hydrate. Some exemplary embodiments specifically provide a method of reactivating the sorbent by hydrating it at a high temperature of about 600° C. and a pressure higher than about 6 bars in order to lower the parasitic energy consumption of the process. In other exemplary embodiments, hydration occurs at temperatures high enough such that heat generated from exothermic reaction can be extracted to generate steam for a steam turbine or used for heat exchange; minimum of at least 300° C. and greater for steam turbine integration. At higher hydration temperatures, greater than about 500° C., process efficiency increases, but hydration must operate at pressures greater than 1 atm. At temperatures between about 300° C. to about 500° C. hydration may occur at about 1 atmosphere. More specifically, temperature from between 350° C. and about 512° C. By hydrating the sorbent at high temperatures the energy loss due to solids heating and cooling can be avoided and most crucially the exothermic energy of hydration can be used to provide the energy required for the dehydration of the sorbent or to generate high quality steam for additional electricity generation. At high temperatures of 600° C., the hydration reaction proceeds to completion only at pressures higher than 6 bars and hence the hydration is conducted at high pressures. In other exemplary embodiments at different temperatures of sorbent hydration, the pressure must also be adjusted to maintain maximum reactivity. This reactivation procedure which follows the calcination step during every carbonation calcination cycle produces a high capacity regenerable sorbent which aids in lowering the total amount of solids in circulation making the $CO_2$ capture process economically attractive.

BRIEF DESCRIPTION OF THE DRAWING(S)

A better understanding of an exemplary embodiment will be obtained from a reading of the following detailed description and the accompanying drawings wherein identical reference characters refer to identical parts and in which.

DETAILED DESCRIPTION OF EXEMPLARY EMBODIMENT(S)

Figure 1:
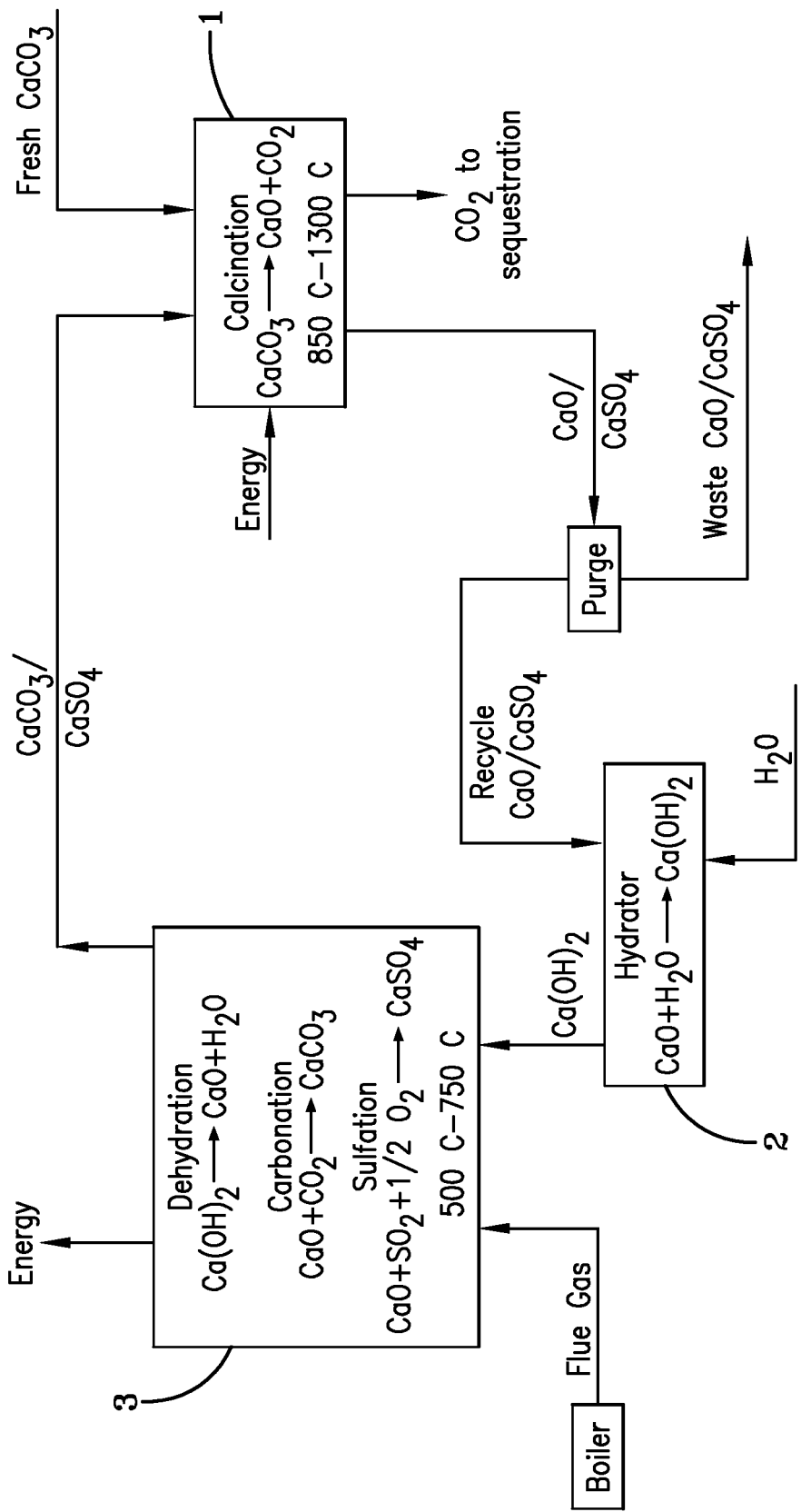
FIG. 1 is an illustration of an exemplary embodiment of a carbonation calcination reaction process for $CO_2$ removal from combustion flue gas.

The regenerability of the calcium oxide sorbent has been the major draw back of high temperature calcium based $CO_2$ capture processes. A potential solution is the ambient water hydration of the sorbent during every cycle which results in the complete reactivation of the sorbent. However, this reactivation technique at ambient temperatures results in very high parasitic energy consumption as high quality heat is required for the dehydration of the sorbent before $CO_2$ capture. In response, exemplary embodiments offer a unique process of pressure hydration to reactivate the sorbent without increasing the parasitic energy of the overall process. Pressure hydration of high calcium content oxides is conducted at temperatures equal to or higher than that used for the dehydration reaction to improve the quality of the heat generated by hydration (for example, at about 300 psi, the hydration temperature is about 600° C.) and making it possible to use this energy for the dehydration reaction. An illustration of the CCR process for $CO_2$ capture from combustion flue gas is provided in FIG. 1. The sorbent mixture consisting of recycled as well as fresh calcium sorbent is fed to a calciner 1 where it is calcined at 950° C. The resultant lime is conveyed to a pressure hydrator 2 where steam and the lime react to produce $Ca(OH)_2$. The $Ca(OH)_2$ is dehydrated to form CaO either in a separate dehydration reactor (not shown in FIG. 1) or in the carbonation reactor 3 where the CaO reacts with the flue gas to form $CaCO_3$ and $CaSO_4$ and a $CO_2$ and $SO_2$ free gas stream. In some exemplary embodiments, $SO_2$ may be independently removed prior to $CO_2$ removal. The sorbent from the carbonation reactor is then conveyed back to the calciner 1 and the process is continued.

The reactions occurring in the carbonator are:

$$Ca(OH)_2 \rightarrow CaO + H_2O$$

$$CaO + CO_2 \rightarrow CaCO_3$$

$$CaO + SO_2 \rightarrow CaSO_4$$

The reaction occurring in the calciner is:

$$CaCO_3 \rightarrow CaO + CO_2$$

The reaction occurring in the hydrator is:

$$CaO + H_2O \rightarrow Ca(OH)_2$$

Experiments have verified the capture of 99% of the $CO_2$ and 100% of the $SO_2$ by the CCR process. ASPEN simulations conducted for the integration of the CCR process in a conventional power plant have shown that the parasitic energy requirement is 20-24% which is lower than the 30% parasitic energy for the amine process and the 28% for the oxy combustion process.

Application of the Pressure Hydration Process to the Calcium Looping Process (CLP)

The use of pressure hydration of high calcitic limes can improve the thermal efficiency of the calcium looping process by the complete removal of $CO_2$ during the water gas shift reaction (WGS). The insitu removal of the product $CO_2$ during the WGS reaction enhances the yield of hydrogen produced. Currently, pressure hydration is used to convert both dolomitic limestones and high magnesium content ores into hydrates (either Calcium hydrate/magnesium hydrate mixtures or magnesium hydrate). The exemplary embodiments use pressure hydration of high calcium content oxides to improve the quality of the heat generated by hydration (for example, at 300 psi, the hydration temperature is 600° C.) and lower the energy penalty associated with the sorbent enhanced WGS Reaction.

Figure 2:
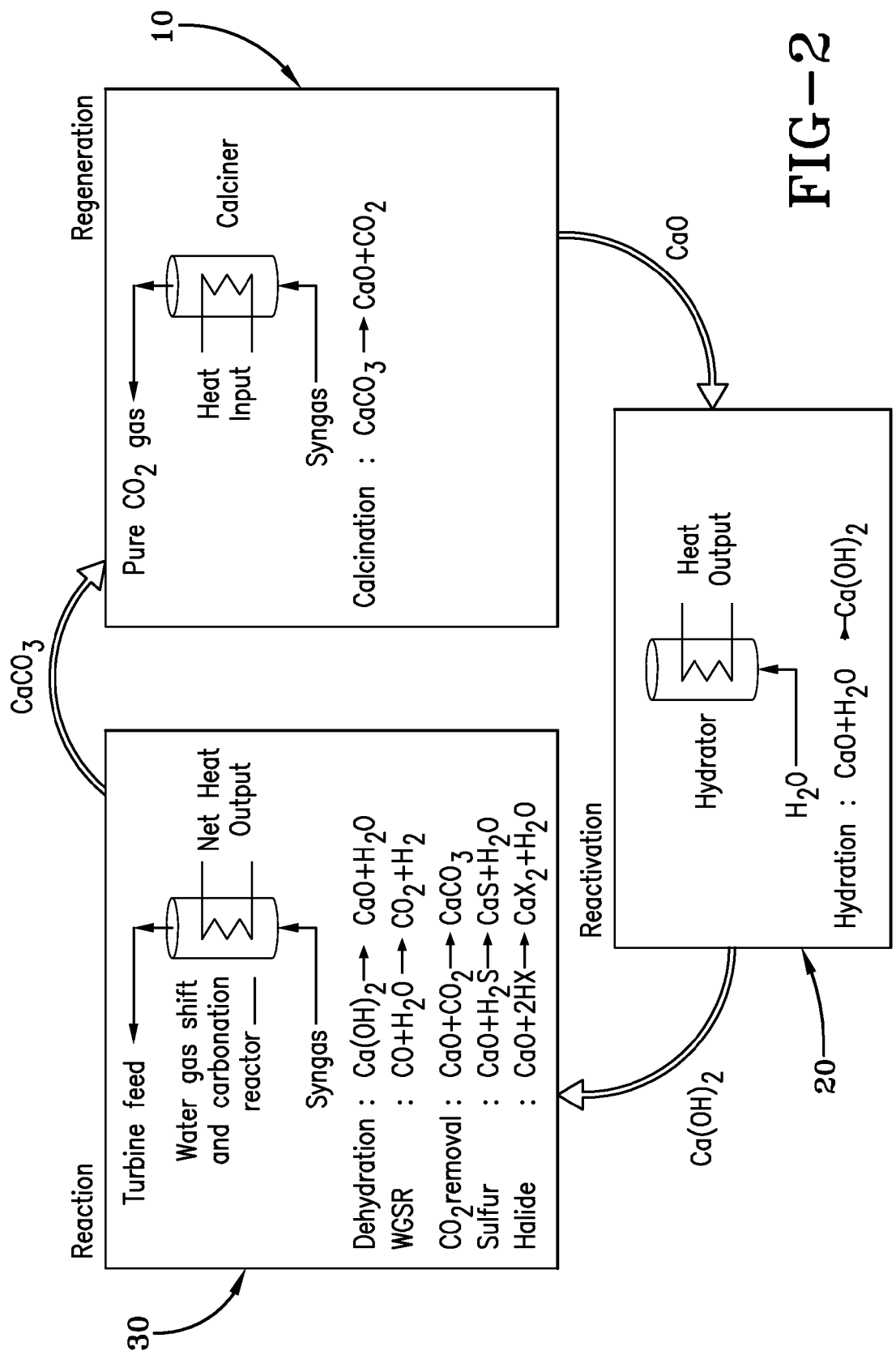
FIG. 2 is a schematic diagram of the calcium looping process for hydrogen production used with exemplary embodiments of the present invention.

An illustration of the calcium looping process is shown in FIG. 2. The $Ca(OH)_2$ along with the syngas is fed to the carbonation reactor 30 which is operated at 600° C. The $Ca(OH)_2$ decomposes at 600° C. to form steam and CaO. The steam reacts with the CO in syngas to form $CO_2$ and $H_2$ while the CaO captures the $CO_2$, sulfur and halide impurities. Since all the steam required for the water gas shift reaction is supplied by the decomposition of $Ca(OH)_2$ no excess steam needs to be added to the carbonation reactor 30. The carbonated sorbent is then regenerated in the calciner 10 to form CaO and a sequestration ready $CO_2$ stream if operated below the decomposition temperature of $CaSO_4$. In some exemplary embodiments calciner 10 operating temperatures may be lowered with the addition of diluted gas that can be separated from $CO_2$, such as steam. In some exemplary embodiments, the heat for the calciner 30 may be provided through indirect-fired, oxyfule fired with natural gas, coal, or other fossil fuels. The regenerated sorbent is then injected into a hydrator 20 where it is converted to $Ca(OH)_2$ in the presence of steam at high pressures and temperatures. The reactivated $Ca(OH)_2$ sorbent is then reinjected into the carbonation reactor 30 and the cycle is continued.

The Ohio State University has conducted many experiments showing that atmospheric hydrated high calcium lime is very reactive toward $CO_2$ removal. For example, in the sorbent enhanced WSG Reaction when $Ca(OH)_2$ is injected into a synthetic low, medium BTU syngas and the steam content increased, the WGS reaction approaches nearly 70 to 90% conversion to $H_2$ at one atmosphere pressure.

The reactions occurring in the carbonator are:

$$Ca(OH)_2 \rightarrow CaO + H_2O$$

$$CO + H_2O \rightarrow H_2 + CO_2$$

$$CaO + CO_2 \rightarrow CaCO_3$$

$$CaO + H_2S \rightarrow CaS + H_2O$$

$$CaO + COS \rightarrow CaS + CO_2$$

$$CaO + 2HCl \rightarrow CaCl_2 + H_2O$$

The reaction occurring in the calciner is:

$$CaCO_3 \rightarrow CaO + CO_2$$

The reaction in the hydrator is:

$$CaO + _2O \rightarrow Ca(OH)_2$$

The lime removes the carbon dioxide from the reaction system permitting more hydrogen to be formed. These same reactions at greater than 5 atmospheres pressure (about 75 psi) achieve nearly 99% hydrogen purity.

A second set of reactions has also been identified that remove carbon dioxide from the gas stream. Hydrated lime can react directly with carbon dioxide to produce limestone and water vapor. This reaction is pressure and temperature sensitive.

$$CO + H_2O \rightarrow H_2 + CO_2$$

$$Ca(OH)_2 + CO_2 \rightarrow CaCO_3 + H_2O$$

The one problem with these two enhanced WGS reaction mechanisms is the energy penalty associated with the hydration or the reactivation step. Atmospheric hydration releases its hydration energy at about 110° C. This is lower than the dehydration temperature of hydrated lime. Additional energy must be used to raise the quality of the heat so that the dehydration reaction can proceed. Pressurized hydration goes forward at temperatures of 600° C. and 300 psi pressure. This produces heat with a quality that can be used to dehydrate hydrated lime. For minimal pumping energy, the process saves over 235.58 kcal/mole of useful energy. ASPEN model simulations and experimental results have showed that the hydration reaction goes toward calcium hydrate under these conditions.

Reactivity of Pressure Hydrated High Calcitic Lime

The reactivity of pressure hydrated, high calcitic lime and atmospheric hydrated, high calcitic lime were compared. In a batch reactor, a quantity of lime was added, the reactor was heated to 600° C. and the pressure was increased to 300 psi then steam was added. After 30 minutes reaction time, the batch reactor was cooled and the pressure was reduced. The product material was analyzed using a TGA. The product was dehydrated at 700° C. to determine the degree of hydration. Then the resultant lime was reacted with $CO_2$. The calcium utilization was determined. The maximum $CO_2$ capture capacity is 78%; this assumes a pure lime material and 100% reactivity toward $CO_2$. In table 1, the degree of hydration and calcium utilization for pressure hydrated and atmospheric hydrated high calcitic lime is shown.

TABLE 1

Comparison of Pressure and Atmospheric Hydrated Lime

| Variable | Without Hydration | Pressure Hydrated | Atmospheric Hydrated |
|---|---|---|---|
| Percent Hydrated, % | — | 80% | 90% |
| $CO_2$ Capture Capacity, % | 17% | 45% | 55% |

The data in Table 1 indicate that hydration results in the increase in $CO_2$ capture capacity and with the increase in the extent of hydration the capture capacity of the sorbent also increases. The atmospheric hydration test was conducted under ideal conditions with continuous stirring and hence the extent of hydration is very high. The preliminary pressure hydration test was conducted in a fixed bed reactor and hence the extent of hydration is 10% lower than atmospheric hydration. By operating in a fluidized bed reactor the extent of hydration and thus the $CO_2$ capture capacity of the sorbent will be increased. This strongly suggests that pressure hydration is very effective in improving the capture capacity of the sorbent while reducing the parasitic energy consumption of the process.

Figure 3:
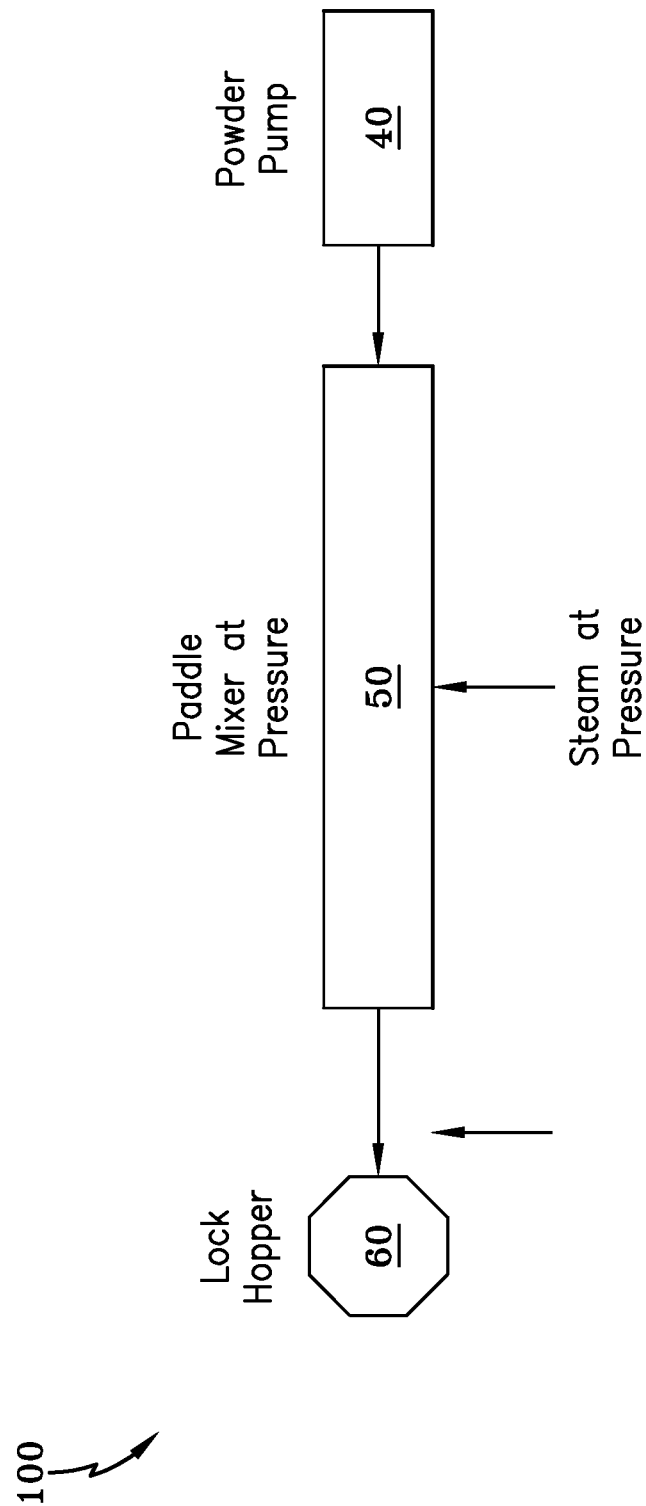
FIG. 3 is an illustration of an exemplary embodiment of a pressure hydrator.

FIG. 3 depicts the design of a pressure hydrator 100 in which the powdered sorbent is pumped into the hydrator 100 which is maintained at high pressure. Steam at high pressure is also fed into the hydrator 100 which has a paddle mixer 50 to promote mixing of the solids with the steam. The hydrated sorbent then exits the hydrator through a lock hopper 60.

Figure 4:
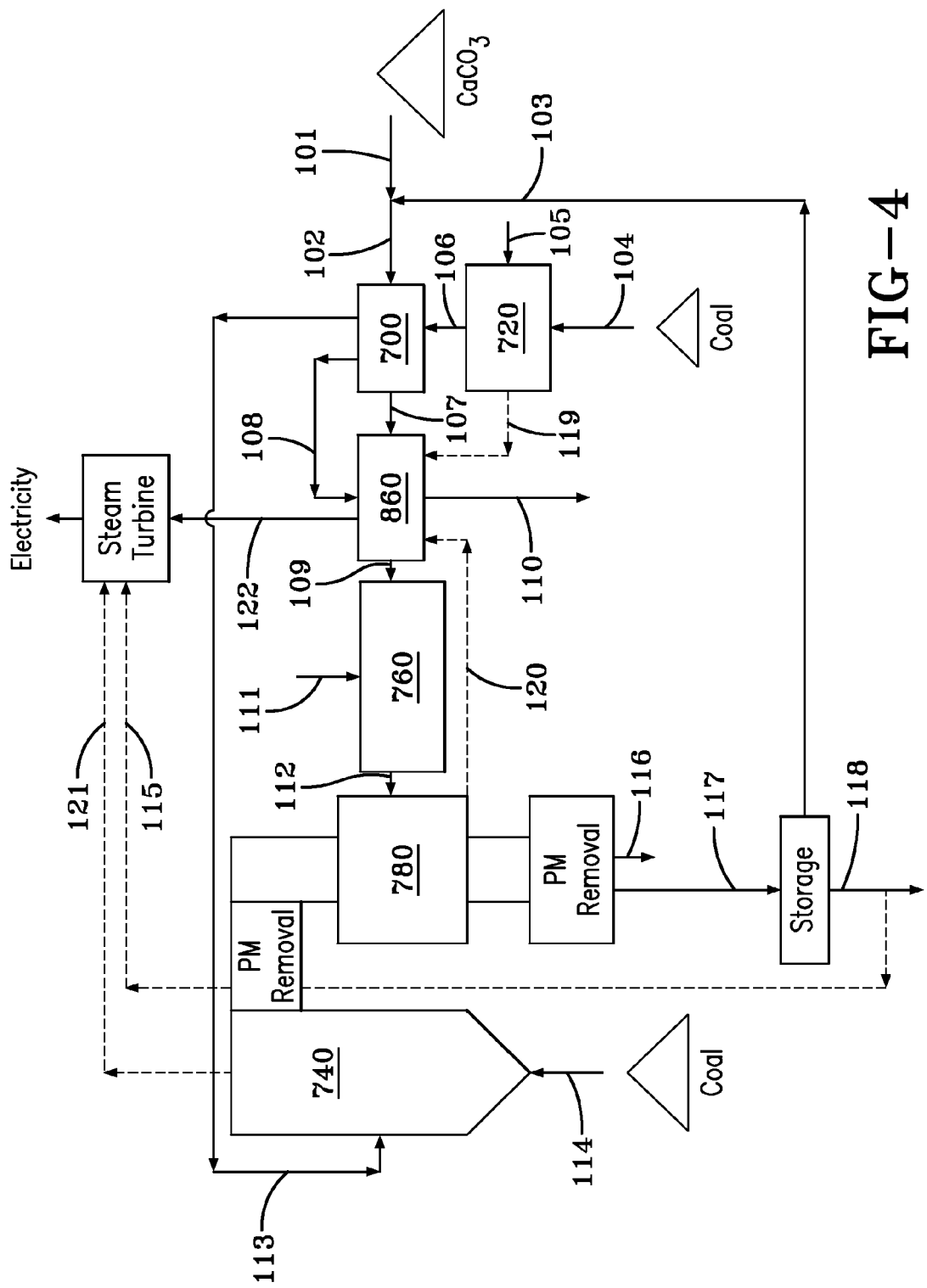
FIG. 4 is a diagram of an exemplary embodiment of the carbonation calcination reaction process in a cola fired power plant.
Figure 5:
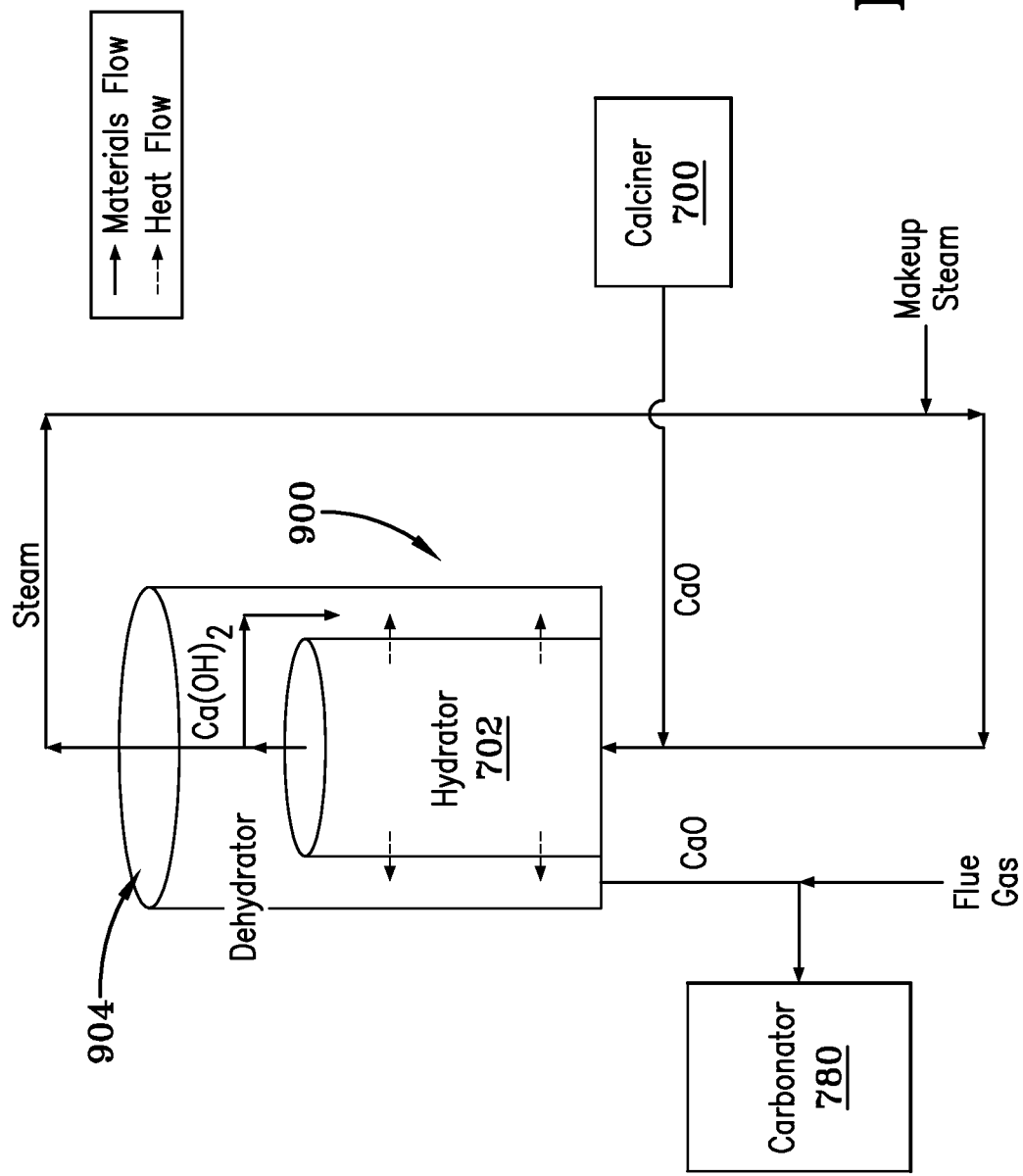
FIG. 5 is a diagram of an exemplary embodiment of a combined hydration dehydration reactor for sorbent reactivation.

FIG. 4 illustrates an exemplary embodiment of the integration of the CCR process in a conventional coal fired power plant for the production of electricity without carbon emissions. Beginning with the calcination kiln 700, fresh limestone make up 101 which ranges from 1-5% of the total sorbent in circulation is added to the recycled sorbent stream 103 and fed to the kiln 700. The energy for the calcination reaction at >900° C. in the kiln 700 is provided by a reheat boiler 720. Coal 104 and oxygen 105 are fed into the reheat boiler 720 and the flue gas 106 is sent to the indirectly heated kiln. The flue gas 113 from the kiln 700 is then routed to the primary boiler 740. The pure $CO_2$ 108 produced in the kiln 700 is cooled and compressed for transportation 110 to the sequestration site. The calcined sorbent 107 is cooled down from >900° C. to 600° C. and fed 109 into the sorbent reactivation reactor 760 shown in more detail in FIG. 5. The high quality heat obtained from the reheat boiler 119 and from cooling the solids and the $CO_2$ is used to generate steam 122 for additional electricity production or to supply the parasitic energy requirement of the process. Steam 111 is fed into the sorbent reactivation reactor 760 which is shown in FIG. 5. The reactivated calcium oxide sorbent 112 is then fed to the carbonation reactor 740. Flue gas generated from burning coal 114 in the primary boiler 740 in addition to the flue gas 113 generated in the reheat boiler 720 is fed to the carbonation reactor 780 where 99% of the $CO_2$ and $SO_2$ in the flue gas are removed by the calcium oxide sorbent. The exothermic energy 120 produced in the carbonator 780 is used to generate additional electricity. The flue gas is separated from the sorbent and emitted into the atmosphere 116. About 1-5% of the sorbent is purged to waste 118 and the rest is recycled back 103 to the kiln 700 and the whole process is repeated.

FIG. 5 depicts an exemplary embodiment of a pressure hydration system 760 which is energy efficient and reduces the parasitic energy requirement of the coal to electricity system. As shown in FIG. 5, pressure hydration unit 902 can be combined with atmospheric dehydration unit 904 to recover the hydration energy. The calcium oxide from the calciner 700 is fed into the hydration system 760 along with steam. The hydration system consists of two concentric cylindrical reactors 902 and 904. The inner reactor 902 is a pressurized vessel where hydration occurs at pressures above 6 bar and at a temperature of 600° C. The CaO reacts with the steam to produced calcium hydroxide which is separated from steam and gravity fed to the outer reactor 904. The outer concentric reactor 904 is at ambient pressure and the sorbent at 600° C. undergoes dehydration to form CaO. The exothermic heat generated in the inner concentric reactor 902 from the formation of $Ca(OH)_2$ is transferred to the outer reactor 904 where it supplies the endothermic energy required for the dehydration reaction. The calcium oxide sorbent produced from the hydration-dehydration reactor 760 is then fed into the carbonator 740 along with the flue gas.

Figure 6:
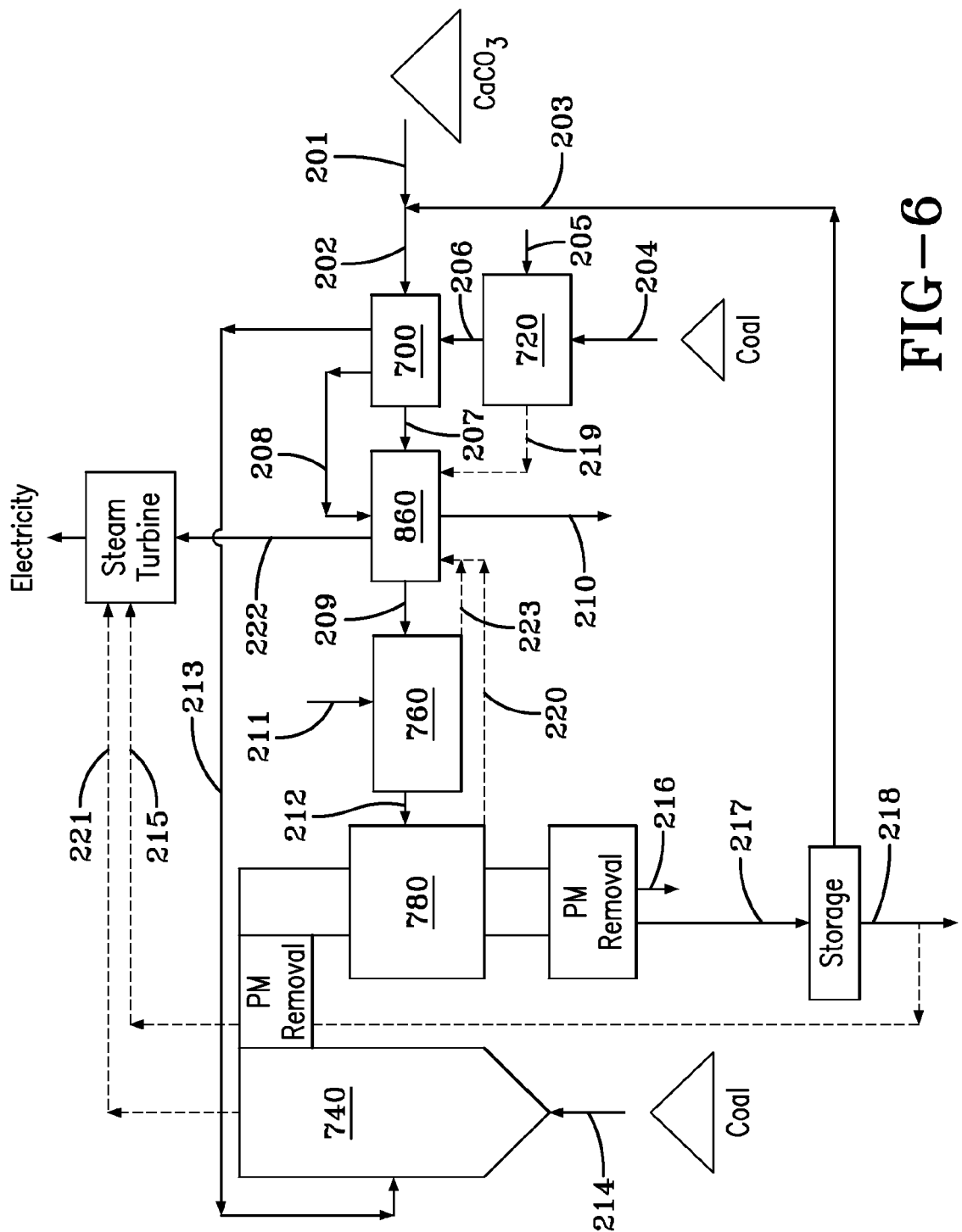
FIG. 6 is another exemplary embodiment illustrating the integration of the carbonation calcination reaction ("CCR") process in a coal fired power plant.

FIG. 6 depicts another exemplary embodiment for the integration of the CCR process in a coal fired power plant. The Calcium oxide 209 produced in the kiln 700 is fed into the pressure hydrator 800 along with steam 211 to form $Ca(OH)_2$. The $Ca(OH)_2$ 212 produced in the hydrator 800 is then directly fed into the carbonator 780 where it simultaneously dehydrates and captures the $CO_2$ and $SO_2$ from the flue gas. The endothermic energy for the dehydration reaction is obtained from the exothermic energy released by the carbonation. In this exemplary embodiment both the carbonator 780 and the pressure hydrator 800 are exothermic and the high quality (600° C.) heat produced 220 and 223 are used to generate additional electricity. In this and other exemplary embodiments, the pressure hydrator 800 may be a simple fixed, fluidized or moving bed reactor and the need for a separate reactor of dehydration is obviated.

Figure 7:
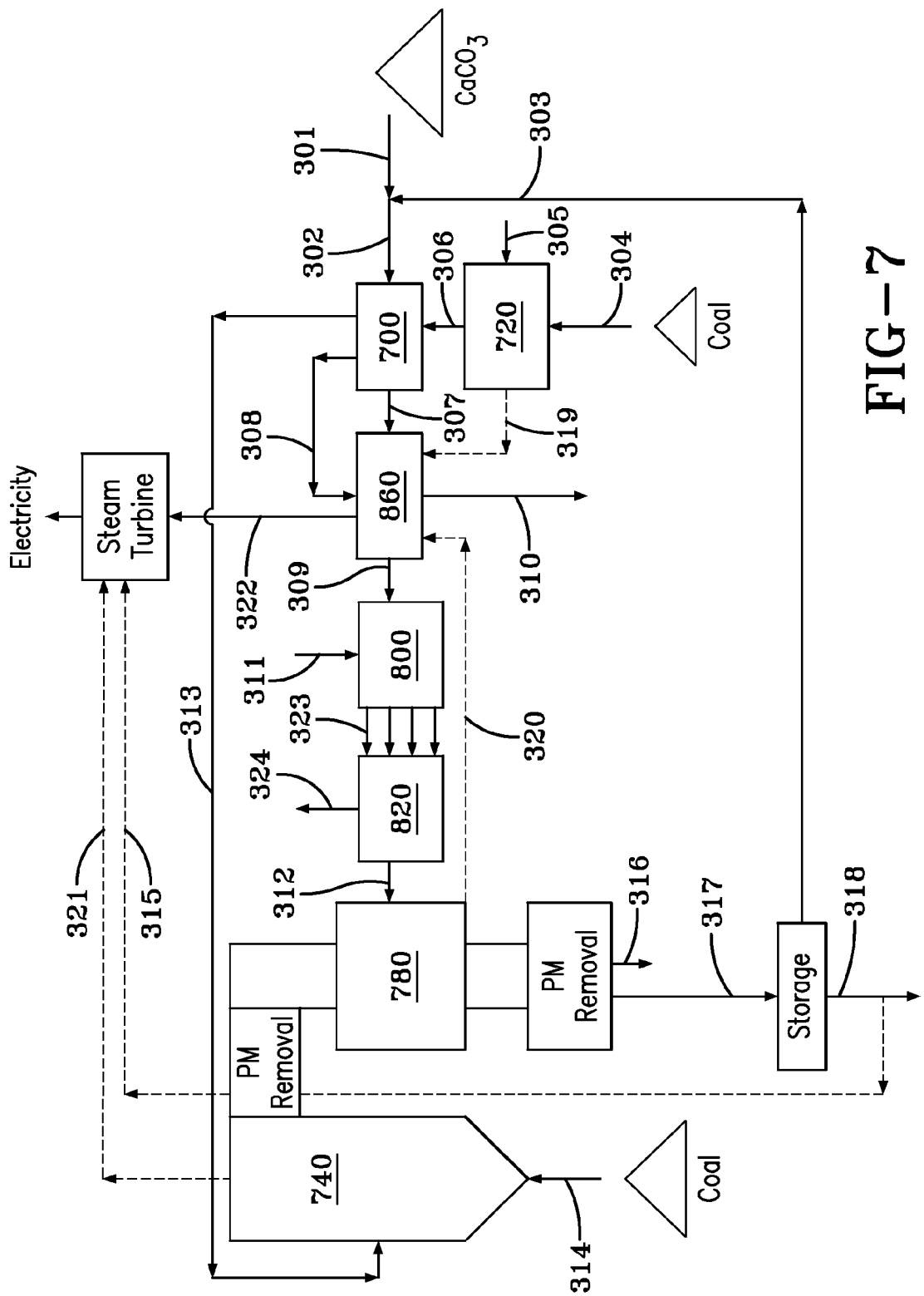
FIG. 7 is another exemplary embodiment illustrating the integration of the CCR process in a coal fired power plant.

FIG. 7 illustrates another exemplary embodiment for the integration of the CCR process in a coal fired power plant. In this embodiment the hydration and dehydration of the sorbent is conducted in two separate reactors 800 and 820 and the heat is transferred from the hydrator 800 to the dehydrator 820 by a working fluid. The calcined sorbent 309 from the calciner 700 is fed into the hydration reactor 800 with steam 311 where they are mixed together at a pressure above 6 bar pressure and a temperature of about 600° C. This causes the calcium oxide to hydrate liberating heat which is absorbed by a working fluid. The hydrated lime 323 is reduced in pressure to 1 atmosphere and conveyed to the dehydration reactor 820 where the 600° C. hydrate begins to dehydrate and the endothermic energy required for the dehydration reaction is provided by the working fluid. The CaO sorbent 312 from the dehydrator 820 is then fed into the carbonation reactor 780 for the capture of $CO_2$ and $SO_2$ from the flue gas.

Figure 8:
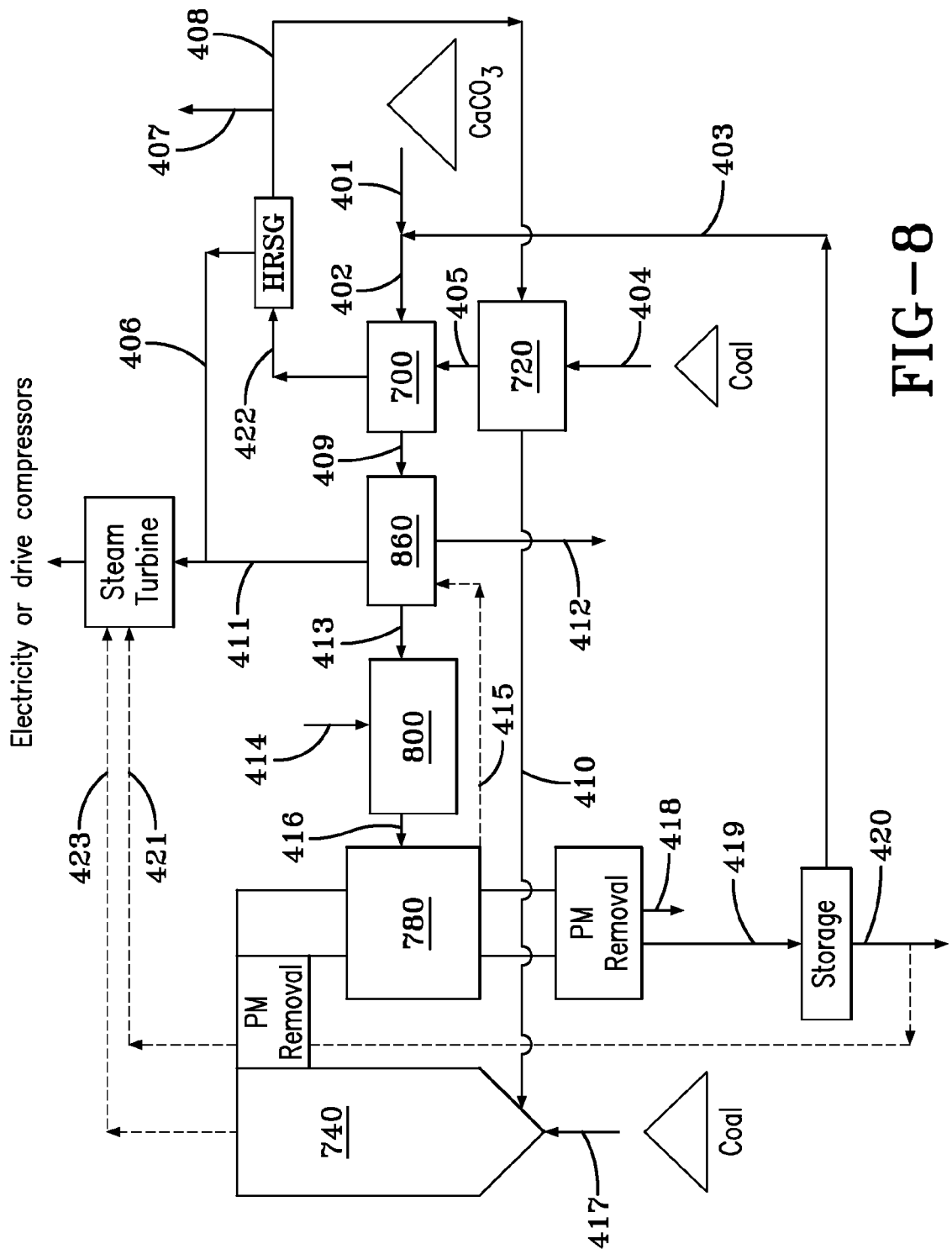
FIG. 8 is another exemplary embodiment illustrating the integration of the CCR process in a coal fired power plant.

FIG. 8 illustrates an exemplary embodiment of heat integration for a coal fired power plant with $CO_2$ capture using the CCR process. Flue gas 405 from the reheat boiler 720 provides the calcination energy and is sent back 408 through the reheat boiler 420 to be heated up further and fed 410 into the primary boiler 740. This is an innovative method of recovering the heat generated in the reheat boiler 720 and producing additional electricity.

Figure 9:
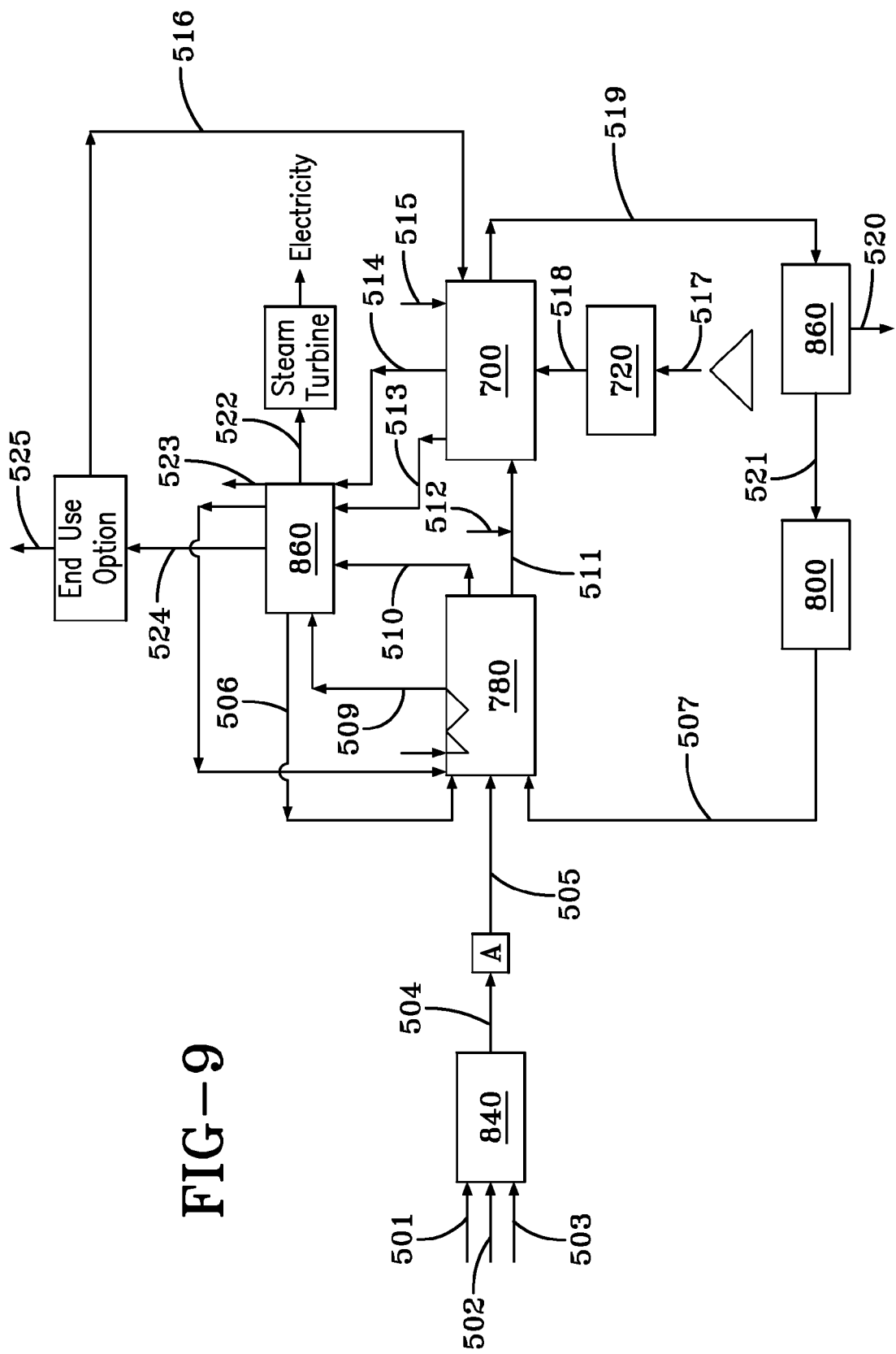
FIG. 9 is another exemplary embodiment illustrating the integration of the CCR process in a coal fired power plant.

FIG. 9 illustrates an exemplary embodiment of integration of $CO_2$ removal by the calcium looping process in a traditional gasification system. Syngas 505 from the gasifier 840 is fed to the carbonator 780 along with steam 506 from the HRSG and $Ca(OH)_2$ 507 from the hydrator 800. The $Ca(OH)_2$ dehydrates in the carbonator 780 providing steam required for the water gas shift reaction and CaO for the removal of $CO_2$, sulfur and halide impurities. The insitu removal of $CO_2$ during the water gas shift reaction improves the yield of hydrogen produced and the product hydrogen stream 510 is cooled down 524 and used as a fuel, to produce electricity, liquid fuels or chemicals. A portion of the sorbent stream from the carbonator 780 is purged and a make up of fresh limestone 512 is added before entering the calciner 700. The energy for the calcination reaction is provided by combusting coal 517 in a reheat boiler 720 and using the flue gas 518 to heat the calciner 700 indirectly. The hot flue gas 514 from the calciner 700 is then cooled down to 600° C. in a HRSG 860 and sent 523 to the carbonator 780 where the CaO sorbent reacts with the $CO_2$ and $SO_2$ in the gas during hydrogen production. The $CO_2$ 514 produced in the calciner 700 is cooled in an HRSG 860 and compressed for transportation and sequestration. A small amount of the hydrogen 516 may also be combusted in the calciner 700 to provide heat directly and steam (which is a product of the combustion) which is a carrier gas and aids in reducing the temperature of calcination. The calcined CaO sorbent 519 is then reactivated by pressure hydration with steam at about 600° C. and a pressure greater than about 6 bars. The $Ca(OH)_2$ 507 produced is then fed directly into the carbonator 780. The exothermic energy 509 from the carbonation reactor 780, hydrator 800, cooling of the $CO_2$, $H_2$, flue gas and solids is used to produce additional electricity a part of which is used to supply the parasitic energy requirement of the process.

The reacted sorbent that exits the carbonation reactor 780 contains calcium carbonate, calcium sulfate and unreacted calcium oxide. One method of operation is to send substantially all the reacted sorbent exiting the carbonator 780 to back into the calciner 700, and through the reactivation process. A second method of operation exists in which the reacted sorbent exiting the carbonator 780 is split into two streams. The first stream may be sent to the calciner 700 for reactivation while a second stream may be sent directly back into the carbonator 780. The two stream approach may aid in reducing the parasitic energy requirement as all the reacted sorbent need not be calcined and recycled every cycle.

In still other exemplary hydration of the sorbent may either be done every cycle after calcination or once every few cycles depending on the extent of sintering of the sorbent.

In still other exemplary embodiments, hydration may be conducted at temperatures between about 300° C. to about 500° C. and about 1 atmosphere. More specifically, between about 350° C. and about 512° C. and about 1 atmosphere. Hydration at temperatures above about 300° C. is sufficient such that heat generated from exothermic reaction can be extracted to generate steam for a steam turbine or used for heat exchange.

Experimental Work

Figure 10:
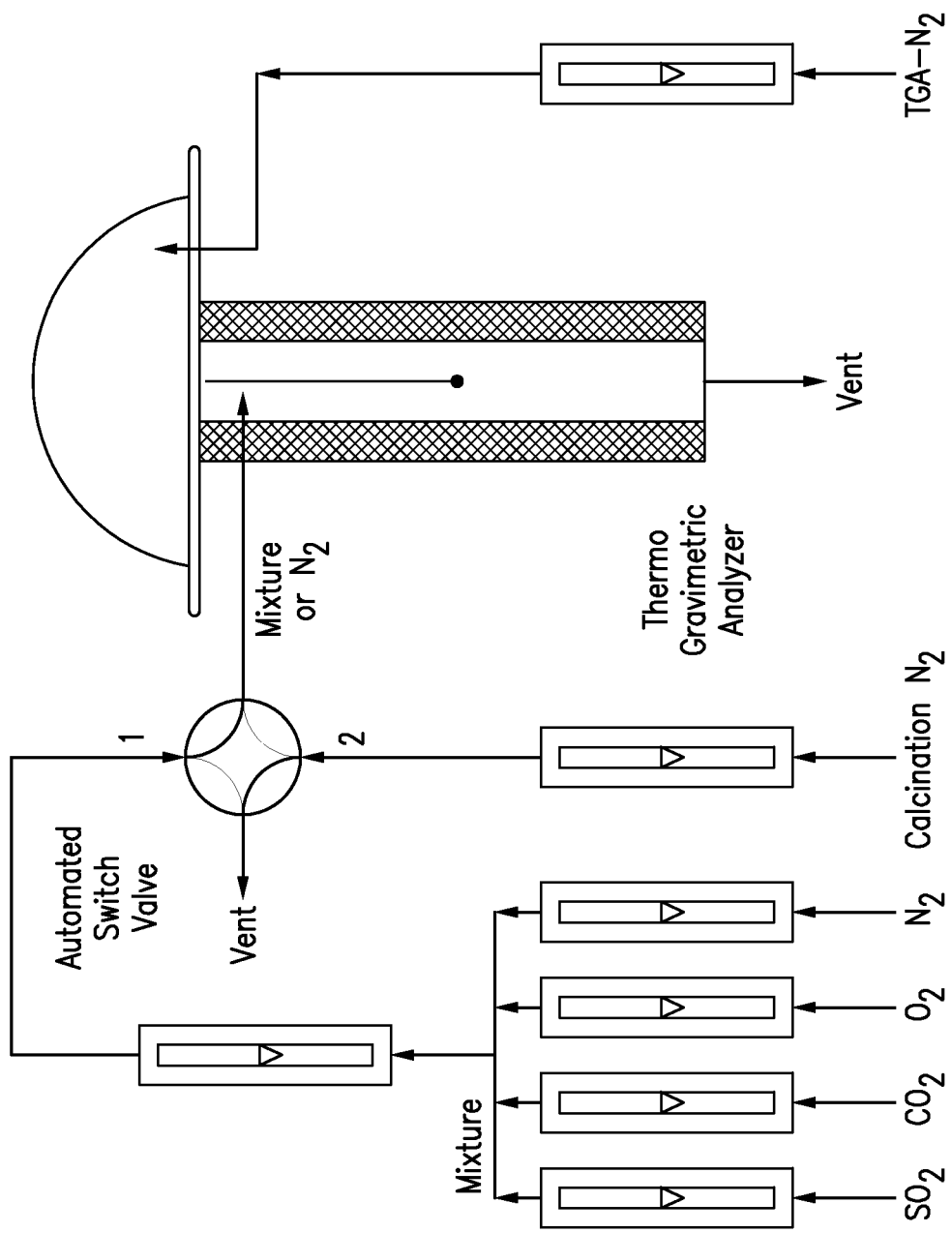
FIG. 10 is a diagram of a thermo gravimetric analyzer.

Experiments were conducted to determine the sorbent with maximum $CO_2$ capture capacity, the effect of multi-cyclic carbonation calcination cycles, the effect of process variables and the extent of reactivation of the sorbent by atmospheric and pressure hydration. Three experimental setups were used: a subpilot scale demonstration of the CCR process integrated with a 20 lb/hr stoker boiler, a bench scale setup with a fixed bed reactor as the carbonator and a rotary calciner and a thermo gravimetric analyzer ("TGA") shown in FIG. 10.

The reactivity testing of CaO sorbents for carbonation was carried out in a Perkin Elmer thermogravimetric analyzer (TGA-7) apparatus. The balance can measure accurately up to 1 μg. A small sample of the sorbent (5-20 mg) is placed in a quartz boat. The weight of the sample was recorded every second. Calcination was conducted in the presence of 100% $N_2$ at 700° C. while carbonation was conduced in the presence of 10% $CO_2$ and 90% $N_2$ at 650 C.

Figure 11:
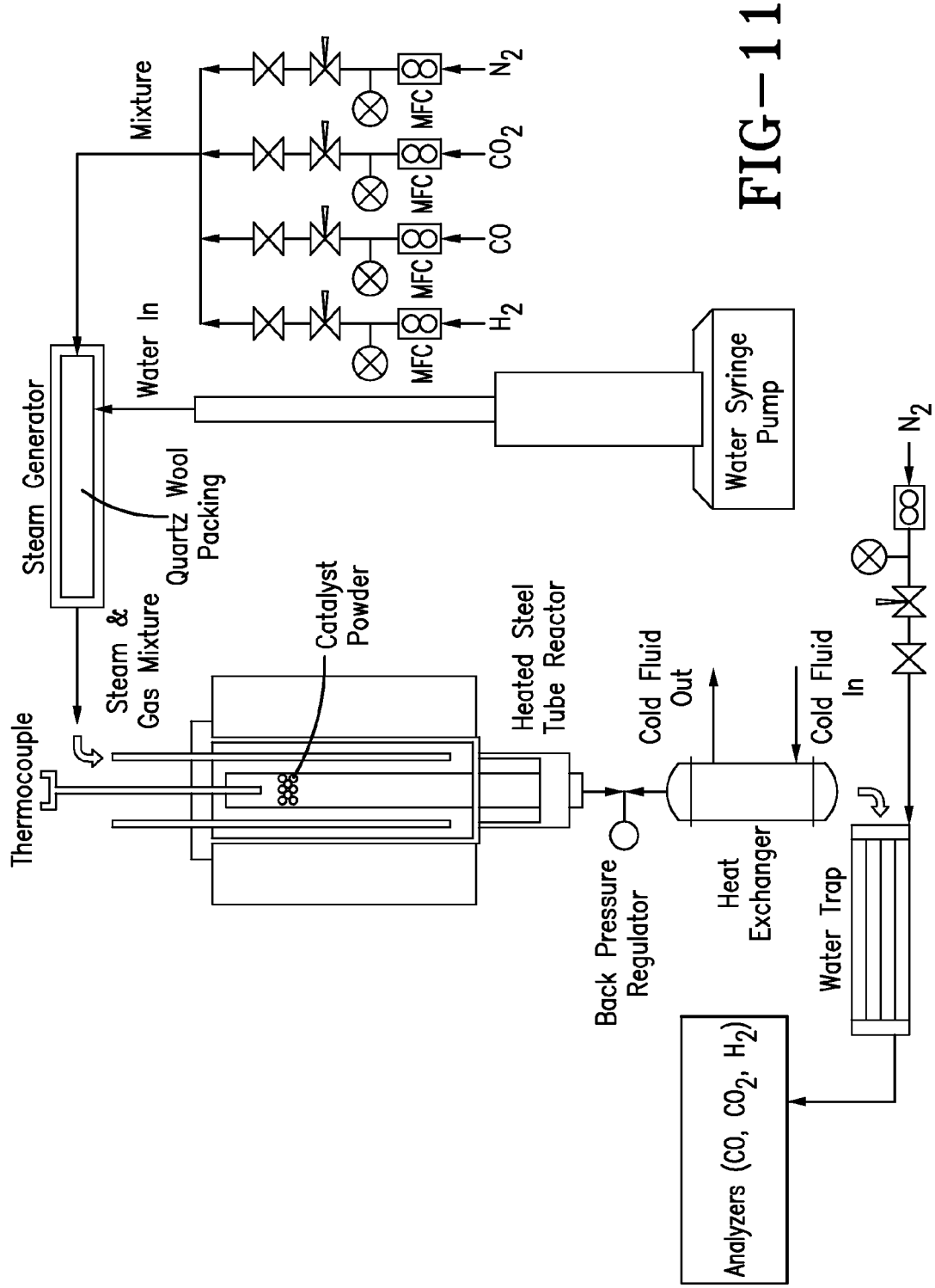
FIG. 11 is a diagram of an integral fixed-bed reactor setup.
Figure 12:
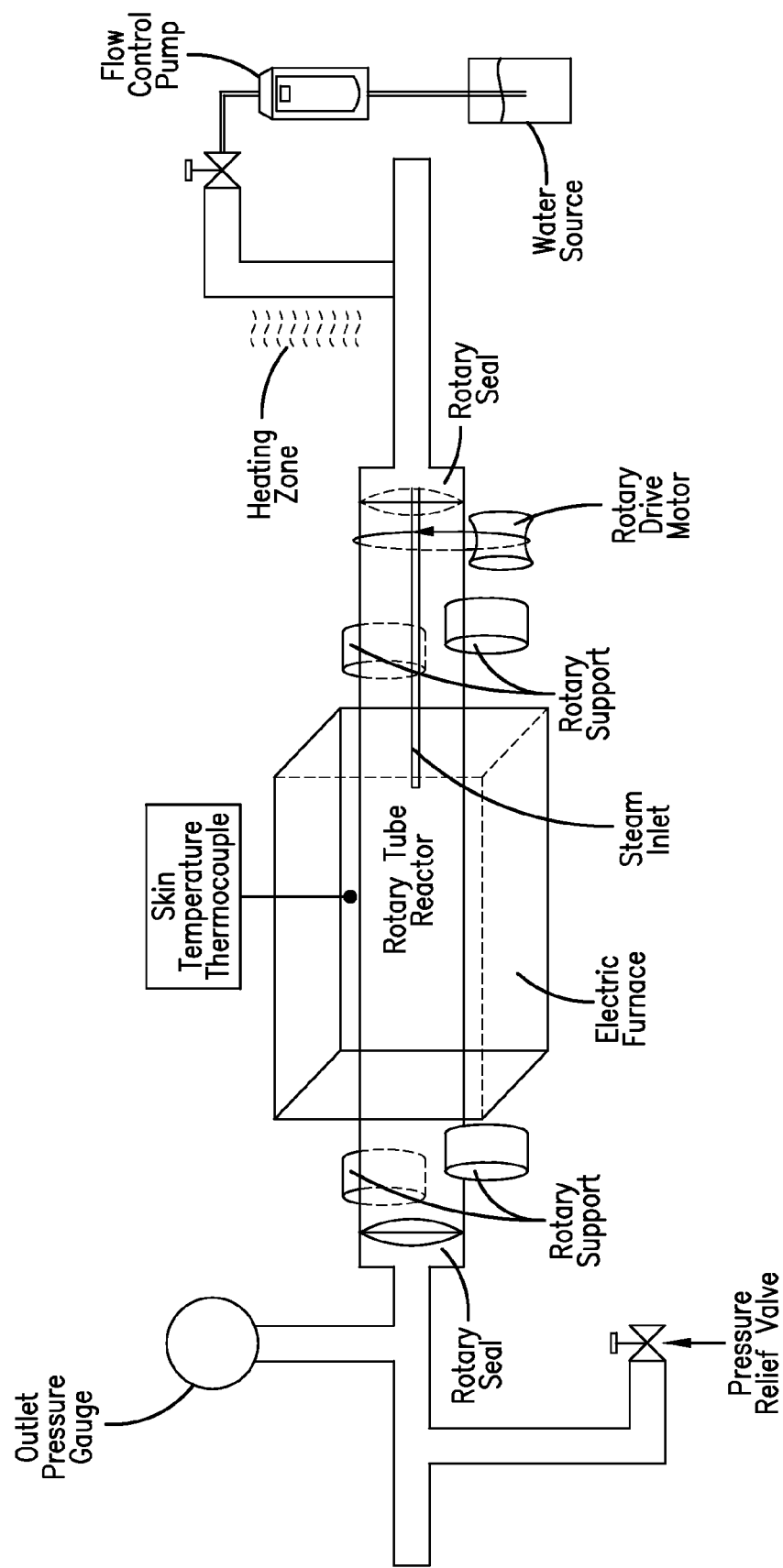
FIG. 12 is a diagram of the rotary calciner experimental setup.

Bench Scale Setup:

FIG. 11 is an illustration of an integral fixed-bed reactor setup. FIG. 12 is diagram of a rotary calciner experimental setup. The bench scale experimental setup consists of a fixed bed reactor connected to a continuous gas analysis system and a rotary calciner connected to a $CO_2$ analyzer. Calcination under realistic conditions was conducted in the rotary calciner at various temperatures ranging from 800° to 1000° C. Different carrier gases such as steam and $CO_2$ were evaluated and a residence time of 30 minutes was maintained.

A fixed bed reactor was used to conduct carbonation, pressure hydration and experiments for the production of hydrogen from syngas by the simultaneous water gas shift and carbonation reaction. The mixture of gases from the cylinders is regulated and sent into the fixed bed reactor by means of mass flow controllers. The mass flow controllers can handle a pressure of about 21 atmospheres. From the mass flow controllers the reactant gases flow to the steam generating unit. The steam generating unit is maintained at a temperature of 200° C. and contains a packing of quartz chips which provide a large surface area of contact between the reactant gases and the water. The steam generating unit not only facilitates the complete evaporation on the water being pumped into the steam generating unit but it also serves to preheat the reactant gases entering the reactor. The reactor has been provided with a pressure gauge and a thermocouple to monitor the temperature and pressure within. The reactant gases leaving the reactor enter the back pressure regulator which builds pressure by regulating the flow rate of the gases. The pressure regulator is very sensitive and the pressure within the reactor can be changed quickly without any fluctuations. The back pressure regulator is also capable of maintaining a constant pressure for a long period of time thereby increasing the accuracy of the experiments conducted. This back pressure regulator is capable of building pressures of up to 68.9 atmospheres (1000 psig). As shown in FIG. 11, the inlet of the backpressure regulator is connected to the reactor rod and the outlet is connected to a heat exchanger. The product gas at the exit of the heat exchanger is conditioned in a tower containing a desiccant and is sent to a set of continuous analyzers capable of determining the concentrations of CO, $CO_2$, $H_2S$, CH4 and $H_2$ in the gas stream. 5 g of the sorbent is loaded into the reactor and the pressure, temperature and gas flow rates are adjusted for each run. The steam free gas compositions at the outlet of the reactor are monitored continuously using the CO, $CO_2$, $H_2S$, CH4 and $H_2$ gas analyzer system described above.

The carrier gas containing a mixture of $CO_2$ and steam is fed into a rotating reactor containing the solid to be calcined. The reactor is enclosed in a furnace and heated to the required temperature which is monitored by means of a thermocouple fixed to the reactor. The exit gas is conditioned and fed into a $CO_2$ analyzer which is used to detect the onset and completion of the calcination reaction.

Figure 13:
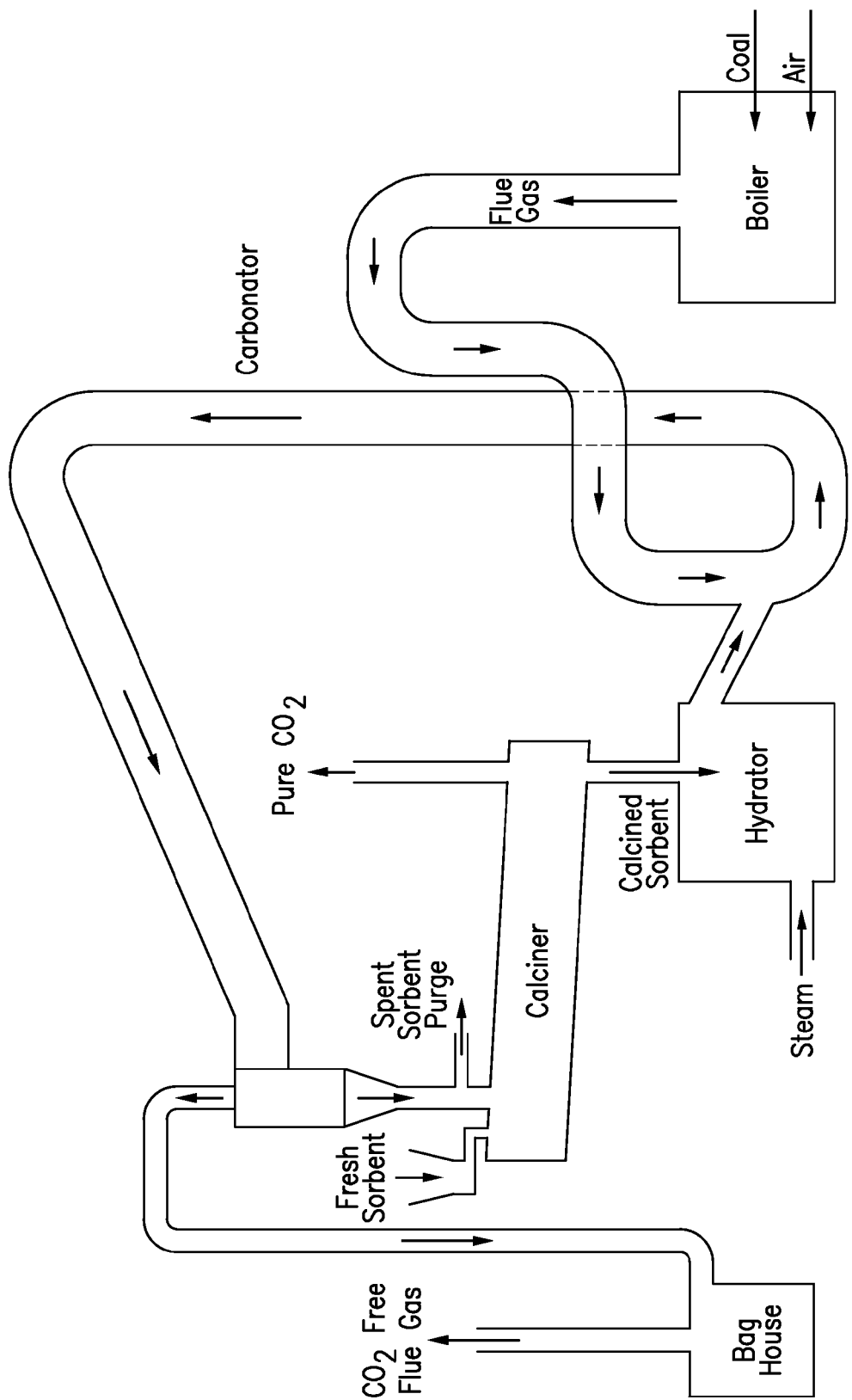
FIG. 13 is a diagram of a sub-pilot plant demonstration of the CCR process for $CO_2$ and $SO_2$ capture.

Subpilot Scale Demonstration:

FIG. 13 is a diagram of a sub-pilot plant demonstration of the CCR process for $CO_2$ and $SO_2$ capture. An underfed stoker combusts approximately 20 pounds per hour of stoker-grade coal. The generated flue gas stream contains 10%-15% carbon dioxide ($CO_2$) and approximately 5000 ppm of sulfur dioxide ($SO_2$). A variable-frequency Induced Draft (ID) fan, located at the end of the process, pulls the flue gas stream through the ductwork. A zero-pressure point is maintained in the stoker, where the negative pressure of the ID fan is balanced by the positive pressure of the air blower, which is used as the source of oxygen for coal-combustion.

A Schenck-Accurate mid-range volumetric hopper, with a maximum feed rate of roughly 400 pounds per hour, mechanically screwfeeds the solid sorbent, calcium hydroxide (Ca(OH)$_2$, commercially known as hydrated lime), into a FEECO rotary calciner. The feed rate of the sorbent is set by controlling the revolutions per minute of the screw and obtained through correlations between the feed rate and the revolutions per minute.

The FEECO rotary calciner is indirectly-heated via electricity and has a variable residence time between 30 minutes and 45 minutes. The residence time is controlled by a variable frequency drive that determines the revolutions per minute of the rotary calciner. The sorbent, while in the calciner, can be preheated to minimize the temperature drop that occurs in the carbonator reactor. A double-dump valve, which acts as a gas-solid separator, and an exhaust are located at the outlet of the calciner. The double-dump valve allows the pressure in the rotary calciner to be maintained without being affected by the pressure in the flue gas stream, while also allowing the solids to enter the carbonation reactor, where the sorbent contacts the flue gas stream.

The carbonation reactor contacts the flue gas stream and the solid sorbent in the temperature range between 400° C. and 750° C. The solid sorbent is injected in the downer of the carbonation reactor and is entrained by the flue gas stream. In the carbonation reactor, the solid sorbent simultaneously decomposes into calcium oxide (CaO, commercially known as lime) and water ($H_2$O) and reacts with both carbon dioxide ($CO_2$) and ($SO_2$) present in the flue gas stream to form calcium carbonate ($CaCO_3$, commercially known as limestone) and calcium sulfate ($CaSO_4$, commercially known as gypsum). The residence time in the entrained bed reactor can be varied between 0.3 seconds and 0.6 seconds.

Following the carbonation reactor is a cyclone. The flue gas, and any solids not captured by the cyclone, report to a Torit-Donaldson down-flow baghouse, where any captured solids report to a 55-gallon drum and the particulate-free flue gas stream exits to the outside atmosphere. The solids captured by the cyclone then enter into the calciner.

At the completion of each carbonation cycle, the calciner outlet is disconnected from the carbonation reactor and connected directly to a 55-gallon drum. The solids collected in the baghouse are then placed into the Schenck-Accurate hopper. The calciner is pre-heated to a maximum temperature of 950 C. Upon completion of heating, the solid from the carbonation reactor are fed into the calciner.

In the calciner, the limestone decomposes into calcium oxide and carbon dioxide ($CO_2$). Due to the stability of the calcium sulfate, it remains as calcium sulfate in the calciner. The pure, dry $CO_2$ gas exits through the exhaust of the calciner, while the solid mixture, consisting of calcium oxide, calcium carbonate, and calcium sulfate, reports to the 55-gallon drum. The collected solids are then hydrated at atmospheric conditions to produce a dry hydrate, which completes the cycle. The dry hydrate formed is used as the feed for the next cycle.

To monitor the gas composition and analyze the percent removal of both carbon dioxide and sulfur dioxide, two sets of gas analyzers are employed. One set of gas analyzers is located upstream of sorbent injection and is used as the baseline. The other set of gas analyzers is located downstream of the sorbent injection. The difference between the two measurements determines the percent removal. The gas analyzers are CAI 600 analyzers and continuously monitor the concentrations of $CO_2$, $SO_2$, and CO. In addition, a CAI NOxygen analyzer monitors the upstream oxygen and nitrogen oxides concentration, while a Teledyne Analytical P100 analyzer monitors the downstream oxygen concentration. All data is continuously recorded to a computer.

In addition, over 20 thermocouples continuously measure the temperature throughout the system. Several manometers are used to measure the pressure drop and static pressure of the system.

Figure 14:
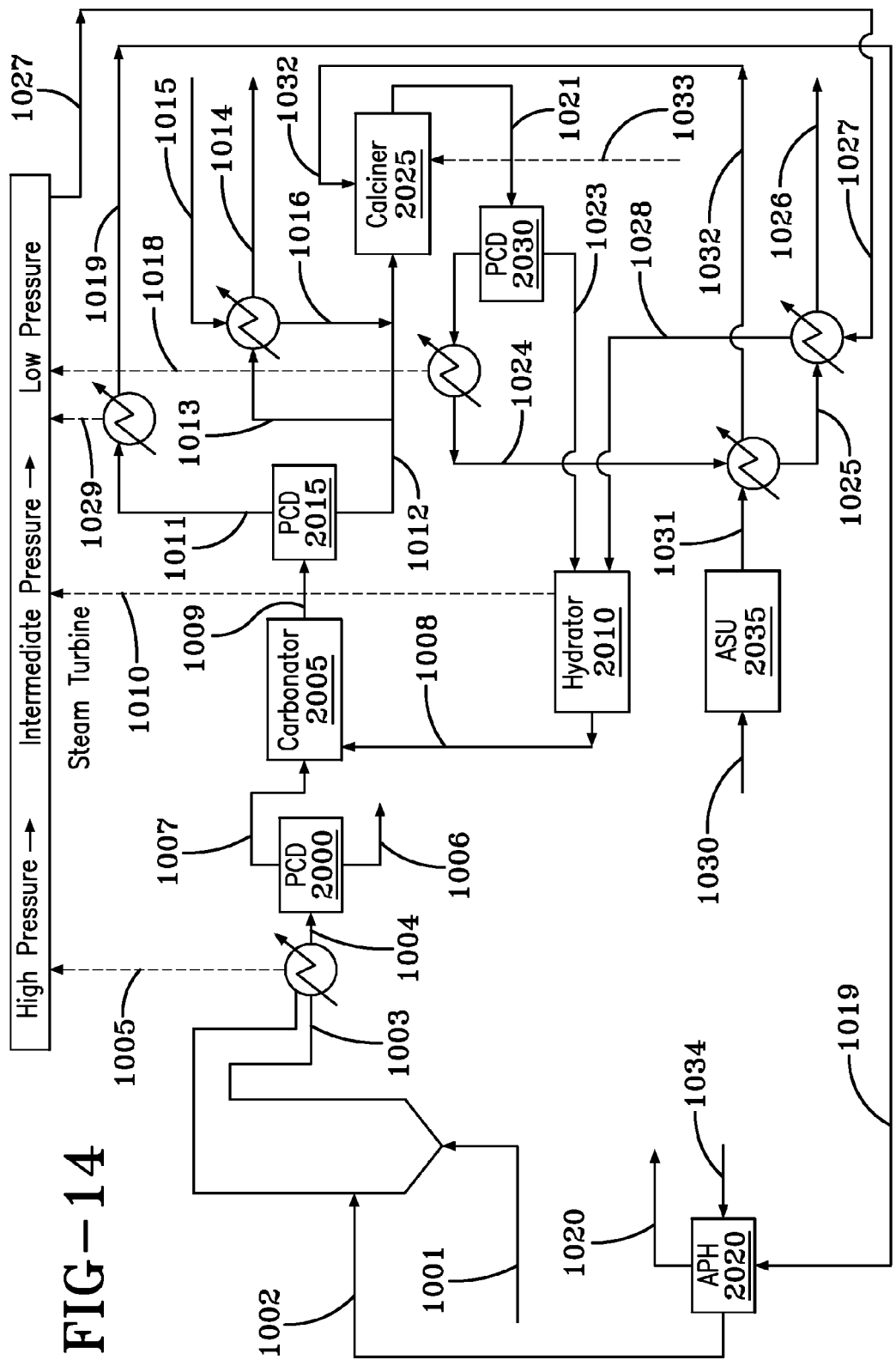
FIG. 14 is another exemplary embodiment illustrating the integration of the CCR process in a coal fired power plant.

Power Plant Integration:

FIG. 14 illustrates the integration of the inventive calcium-sorbent based three step carbonation-calcination-hydration process in a conventional coal-fired power plant for the production of electricity while reducing or eliminating carbon emissions. The combustion of coal 1001 using preheated air 1002 generates heat which is used to produce steam that is used for the production of electricity. The flue gas 1003 exits the boiler at a temperature of about 2000° C. and is cooled to approximately 600° C. In other exemplary embodiments, the flue gas stream may be drawn post-economizer or post-SCR depending on the configuration of the power plant. The excess heat 1005 from the flue gas cooling process is used in steam generation. The cooled gas 1004 enters a particle capture device (PCD) 2000 where about 90% of the ash 1006 is removed. In other exemplary embodiments, there is no separate ash removal. In still other exemplary embodiments, the ash removal from PCD 2000 is less than 90%.

The separated gas 1007 then enters the carbonator 2005. In this exemplary embodiment, the carbonator 2005 operates in a range from about 500° C. to about 700° C. In other exemplary embodiments, the carbonator operates at a temperature of approximately 600° C. Hydrated calcium oxide 1008 exits the hydrator 2010 and enters the carbonator 2005. When the hydrated calcium oxide 1008 enters the carbonator 2005 approximately 90% of the $CO_2$ and approximately 100% of the $SO_2$ is removed from the gas stream under suitable calcium to carbon ratios. Although $SO_2$ removal may be accomplished in the carbonator 2005, other exemplary embodiments may employ a separate $SO_2$ reactor or utilize furnace sorbent injection (FSI).

The gas-solid mixture 1009 exits the carbonator 2005 and enters a second PCD 2015 for separation to produce a lean $CO_2$ flue gas 1011. The second PCD 2015 may operate at a temperature identical to the operating temperature of the carbonator 2010. Upon exiting the second PCD 2015, the lean $CO_2$ flue gas 1011 is cooled to produce a cooled lean $CO_2$ gas 1019 and the excess heat 1029 is used for the production of electricity. In another exemplary embodiment, this $CO_2$ lean flue gas 1011 can be sent back directly to the boiler. The cooled lean $CO_2$ gas 1019 then enters the air preheater (APH) 2020 in order to preheat the air 1033 used in the coal combustion boiler. The $CO_2$ lean gas 1020 from the APH 2020 may then be vented into the atmosphere.

The solid stream 1012 exiting the second PCD 2015 is made up of CaCO3, $CaSO_4$ and unreacted CaO. Upon exiting the second PCD 2015, the solid stream 1012 travels to the calciner 2025. To prevent the accumulation of inerts, a purge stream 1013 may be used. In other exemplary embodiments, no separate purge stream is used, rather purging occurs due to the inefficiencies of the PCDs. In still other exemplary embodiments, the purging of solids may occur post-calciner or post-hydrator.

Fresh sorbent 1015, in the form of limestone ($CaCO_3$), is preheated before entering the calciner 2025. As shown in FIG. 14, the fresh sorbent 1015 may be preheated by heat-exchanging with the above mentioned purge stream 1013. The cooled purged solids 1014 are then discarded as waste. After the heat-exchanger, the preheated fresh sorbent 1016 enters the calciner 2025.

The calciner 2025 requires thermal energy 1033 to reach its operating temperature of about 1000° C. In other exemplary embodiments, calciner 2025 requires thermal energy to reach its operating temperature of about 850° C. In still other exemplary embodiments, the calciner 2025 may operate above about 800° C. The required thermal energy 1033 may be provided in a variety of ways, including, but not limited to, harnessing the heat content of the flue gas and the use of supplementary fuel like coal or natural gas. Therefore, one skilled in the art should understand that the calciner 2025 may be an indirectly heated calciner, a oxy-coal fired calciner, or a oxy-natural gas fired calciner. When a fuel is used, the fuel needs to be burned in high-purity $O_2$ 1032 to meet the requirements of purity of sequestrable $CO_2$.

The exit stream 1021 from the calciner 2025 enters a third PCD 2030. The third PCD 2030 separates the gases 1022 from the calcined solids 1023. The gas 1022 is cooled and the extracted heat 1018 is directed to the steam turbine for the production of electricity. The cooled gas 1024 is then heat-exchanged with the high-purity $O_2$ 1031 produced from air 1030 in the air separation unit (ASU) 2035. The gas 1025 exiting the heat-exchanger is again heat-exchanged to preheat steam 1027 drawn from the exit of the low pressure turbine. In other exemplary embodiments, the steam 1027 may be drawn from any pressure region along the steam turbine. Specifically, the steam 1027 may be drawn from areas having a pressure of about 2,000 psi to about 60 psi. Finally, the concentrated $CO_2$ gas 1026 is sent for sequestration. The preheated stream 1028 and the calcined solids 1023 enter the hydrator 2010. In this exemplary embodiment, the hydrator 2010 is operated at approximately 500° C. In other exemplary embodiments, the temperature of the hydrator 2010 maybe between about 300° C. and about 600° C. and operate at pressures from about 1 bar to above 6 bars. After hydration, the hydrated solids 1008 enter the carbonator 2005 thus completing the loop. The exothermic heat 2010 from the hydrator is then directed to the steam turbine for the production of electricity.

Reactivity Testing:

The $CO_2$ capture capacity of calcium oxide obtained from calcium hydroxide, PCC and as received ground lime was determined in a thermogravimetric analyzer. In order to improve the strength of the PCC particles, the PCC powder was pelletized into 2 mm pellets and then ground to a size of 150 microns. The $CO_2$ capture capacity of the PCC pellets as well as the pelletized and broken sorbent was also determined. During these test the calcination was conducted under ideal conditions in 100% $N_2$ at 700° C. and the carbonation was conducted in 10% $CO_2$ at 650° C.

Figure 15:
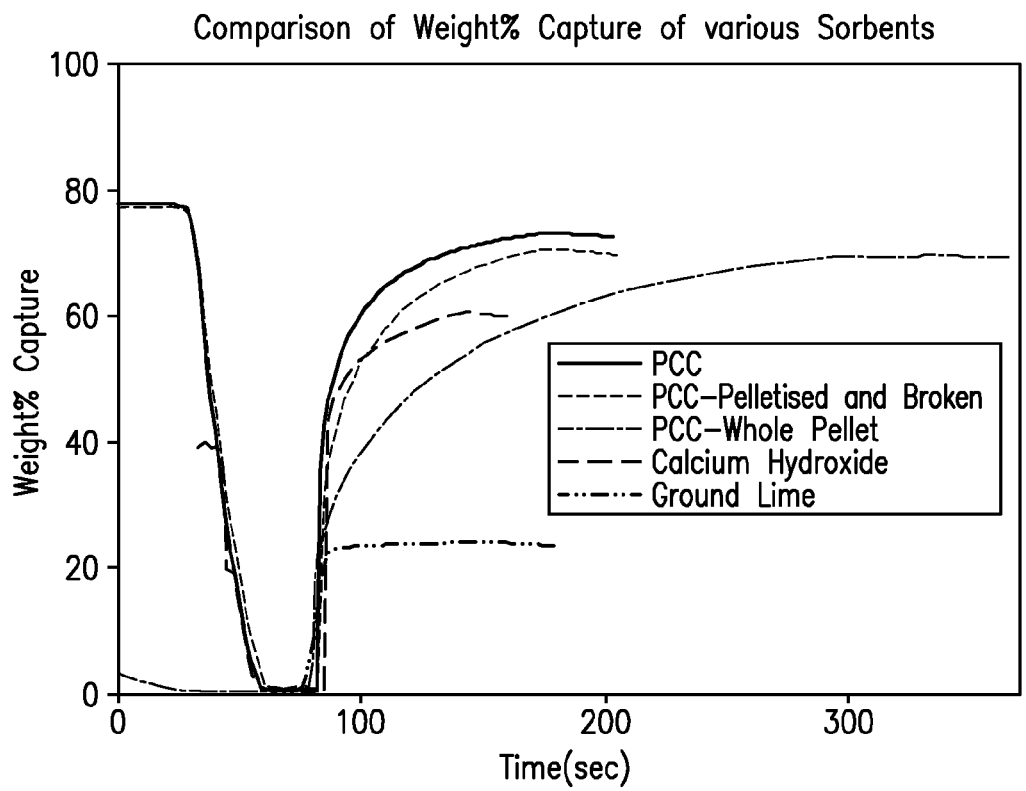
FIG. 15 is a comparison in the $CO_2$ capture capacity of calcium oxide sorbents obtained from different precursors.

The $CO_2$ capture capacity has been defined by the weight % capture which is the grams of $CO_2$ removed/gram of the CaO sorbent. It can be seen that the weight % capture attained by the sorbent obtained from PCC powder is 74% when compared to that of 60% attained by the calcium hydroxide sorbent and 20% attained by the ground lime sorbent. The $CO_2$ capture capacity of the pelletized and broken PCC is almost the same (71%) as the PCC powder as shown in FIG. 15. The PCC pellet requires a very large residence time due to mass transfer resistance but reaches the same final $CO_2$ capture capacity of 71% as that of the PCC pelletized and broken sorbent.

Figure 16:
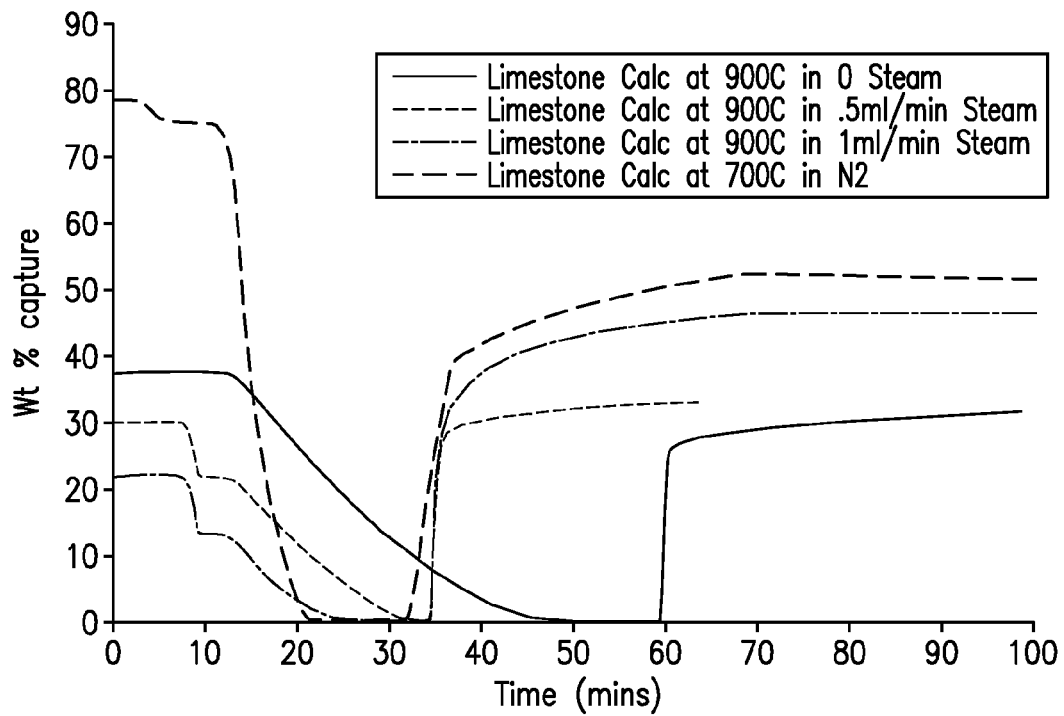
FIG. 16 illustrates the effect of steam calcination on the reactivity of the sorbent.

The effect of realistic calcination conditions in a rotary bed calciner was investigated on the reactivity of the sorbent. The $CO_2$ capture capacity of fresh limestone calcined in $N_2$ at 700° C. is 50 wt %. Calcination in the presence of pure $CO_2$ at 900° C., decreases the $CO_2$ capture capacity of the sorbent to 28 wt %. In order to prevent the excessive sintering of the sorbent in the presence of pure $CO_2$, calcination in the presence of steam was explored. As shown in FIG. 16 the $CO_2$ capture capacity was found to increase from 28% when calcined in pure $CO_2$ to 45% in the presence of 50% of steam and 50% $CO_2$. The effect of the concentration of steam in the carrier gas was also investigated on the $CO_2$ capture capacity of the sorbent. With the increase in the concentration of steam in the carrier gas, the sintering of the sorbent is reduced and the $CO_2$ capture capacity of the sorbent is increased.

Figure 17:
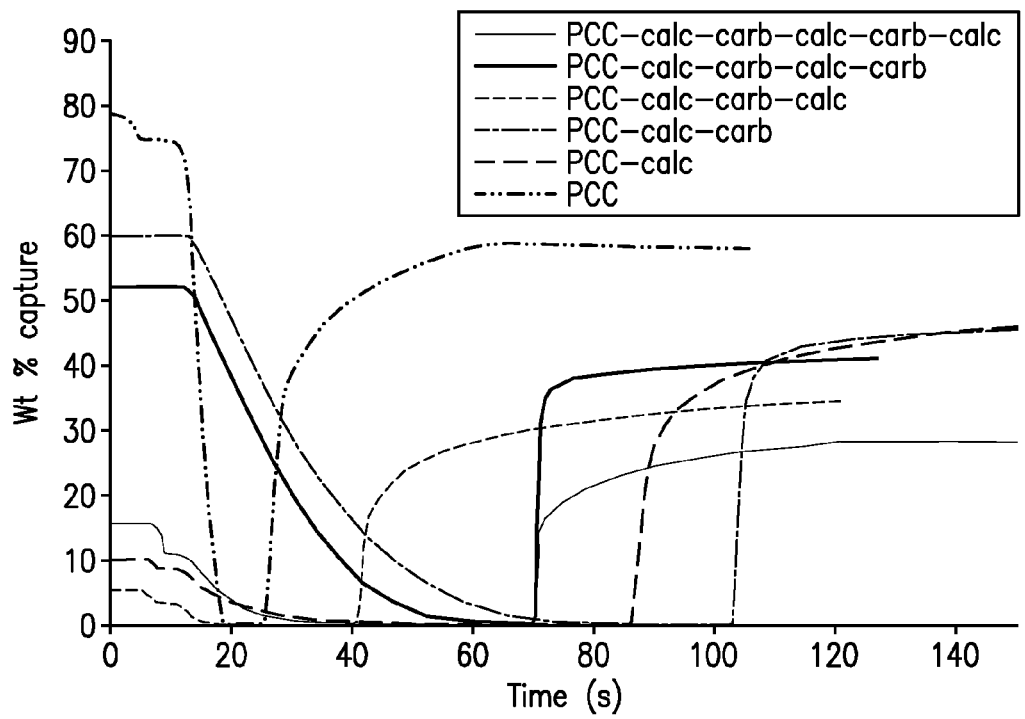
FIG. 17 illustrates the effect of the number of cycles on the capture capacity of the sorbent.

As steam calcination was found to almost double the $CO_2$ capture capacity of the sorbent during the first cycle the effect of subsequent carbonation calcination cycles was determined on the capture capacity of the sorbent. As shown in FIG. 17, the $CO_2$ capture capacity of fresh PCC is 60 wt % capture and after the first calcination at 900° C. in the presence of steam and $CO_2$ it decreases to 45%. During the second cycle calcination it further drops to 35% and during the third to 25%. This decrease in $CO_2$ capture capacity can be attributed to the progressive sintering of the solid at high temperatures in the presence of $CO_2$ and steam. Due to this decrease in $CO_2$ capture capacity of the sorbent the amount of solids in circulation and make up rate of the sorbent would be high and hence there is a need to develop a method for the complete reactivation of the sorbent.

Figure 18:
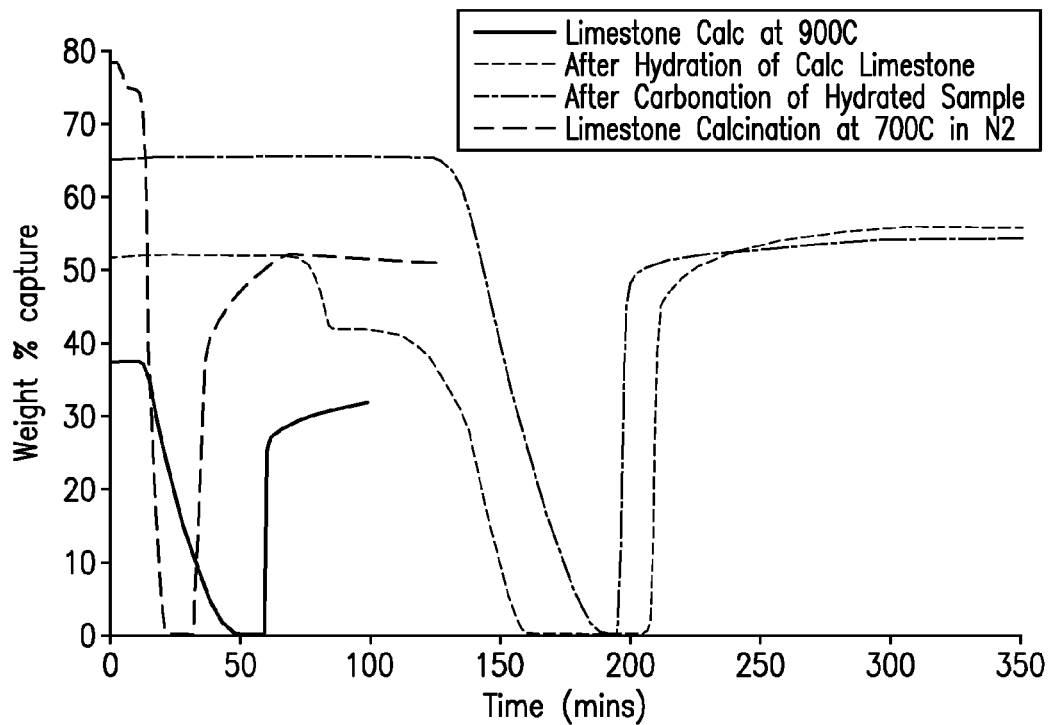
FIG. 18 illustrates the effect of water hydration on the $CO_2$ capture capacity of the sorbent.

In order to reverse the effect of sintering, a method of reactivation of the sorbent by hydration was investigated. Bench scale hydration studies illustrated in FIG. 18 show that the capture capacity of the sorbent calcined at 900° C. in a $CO_2$ atmosphere increased from 30% (6.8 moles/Kg CaO) to >55% (12.5 moles/Kg CaO) on hydration with water. The capture capacity after hydration was found to be higher than the original capture capacity of the sorbent which is 52%.

Figure 19:
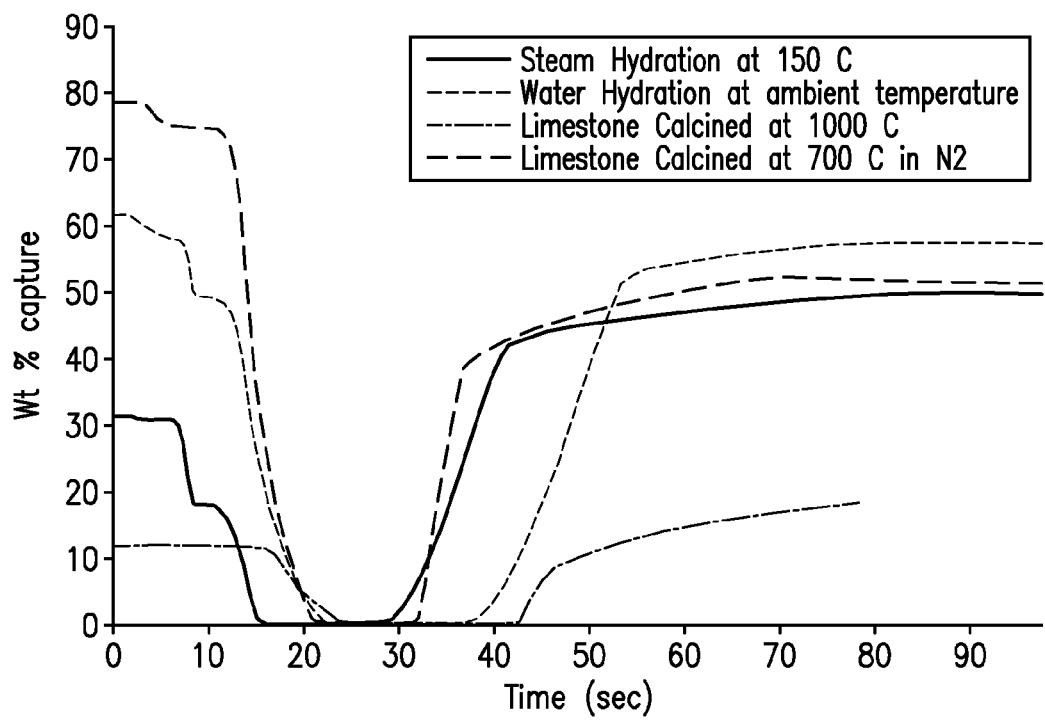
FIG. 19 is a comparison of the extent of reactivation by water and steam hydration.

Hydration was also investigated in the presence of steam at 150° C. and was found to be very effective in increasing the $CO_2$ capture capacity of the sorbent. The increase in $CO_2$ capture capacity from steam hydration was found similar to that produced from water hydration. As shown in FIG. 19 steam hydration increased the $CO_2$ capture capacity from 18 wt % capture to 52 wt % capture while water hydration increased the $CO_2$ capture capacity from 18 wt % capture to 55 wt % capture.

Both water hydration at ambient temperatures and steam hydration at low temperatures have been found to be very effective in improving the $CO_2$ capture capacity of the sorbent. However, the dehydration process which occurs at a higher temperature of 400°-600° C. is endothermic which results in an increase in the parasitic energy consumption of the process. Since hydration is conducted at lower temperatures the exothermic heat of reaction is low quality and cannot be used within the process. In addition, the cooling and reheating of the solids adds further inefficiencies. It has been found from ASPEN simulations of the process that the parasitic energy consumption increases by 13% from 20-24% to 35% due to the addition of hydration to the coal fired power plant with Carbon Capture and Sequestration (CCS) using the CCR process. This is in comparison to a parasitic energy consumption of 30% for a coal to electricity plant with CCS using amine solvents and 28% for an oxy-combustion plant. A solution for decreasing the parasitic energy consumption is to hydrate the sorbent at a temperature higher than the dehydration temperature so that the exothermic hydration energy can be used to supply energy required for the endothermic dehydration reaction.

Figure 20:
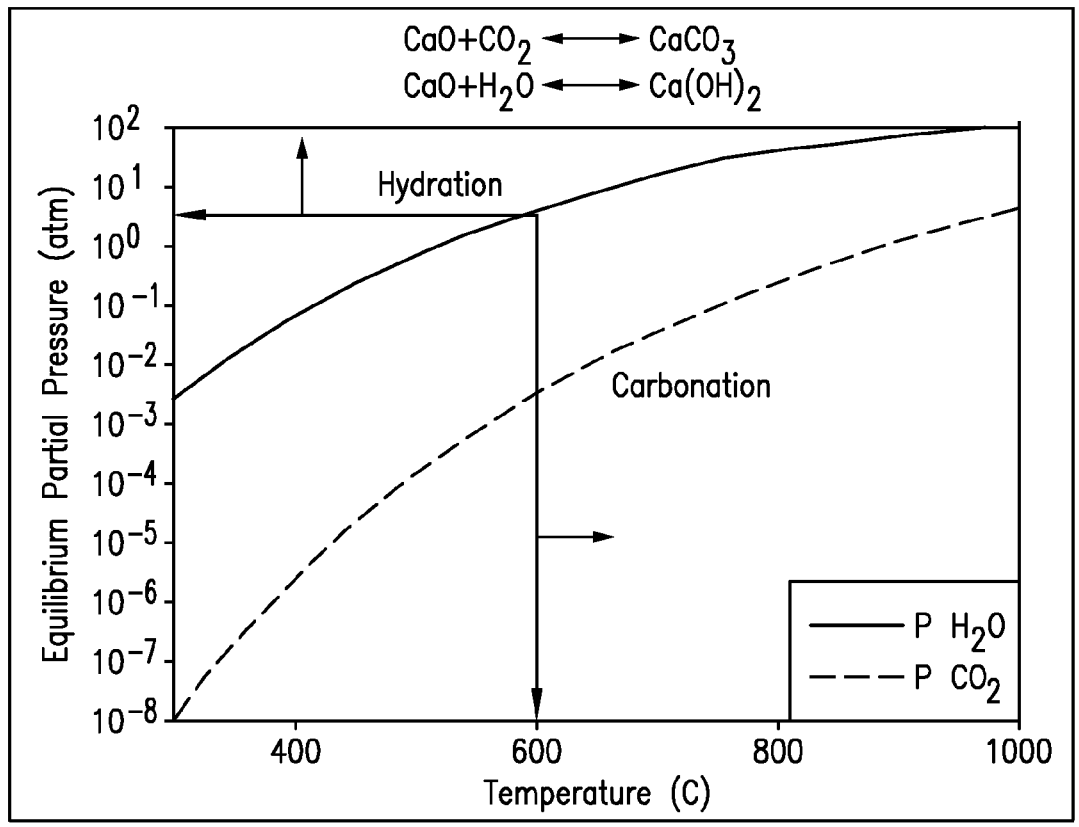
FIG. 20 is a thermodynamic plot for the hydration and carbonation reactions.

In addition, if the hydration temperature is between the temperature of calcination and carbonation, cooling and reheating of the solids is avoided. By conducting hydration at 600° C. it was found from ASPEN simulations that the parasitic energy requirement was reduced to 24%. Hence the addition of hydration to the over all process does not cause an increase in the parasitic energy requirement. At 600° C., CaO does not undergo hydration at atmospheric pressure as shown in FIG. 20. Hence in the calcium looping process hydration is conducted at a pressure of 6 bar and higher to completely hydrate the sorbent. Hence by performing hydration at high pressures and temperatures, the sorbent reactivity is completely restored and the process efficiency is increased.

Figure 21:
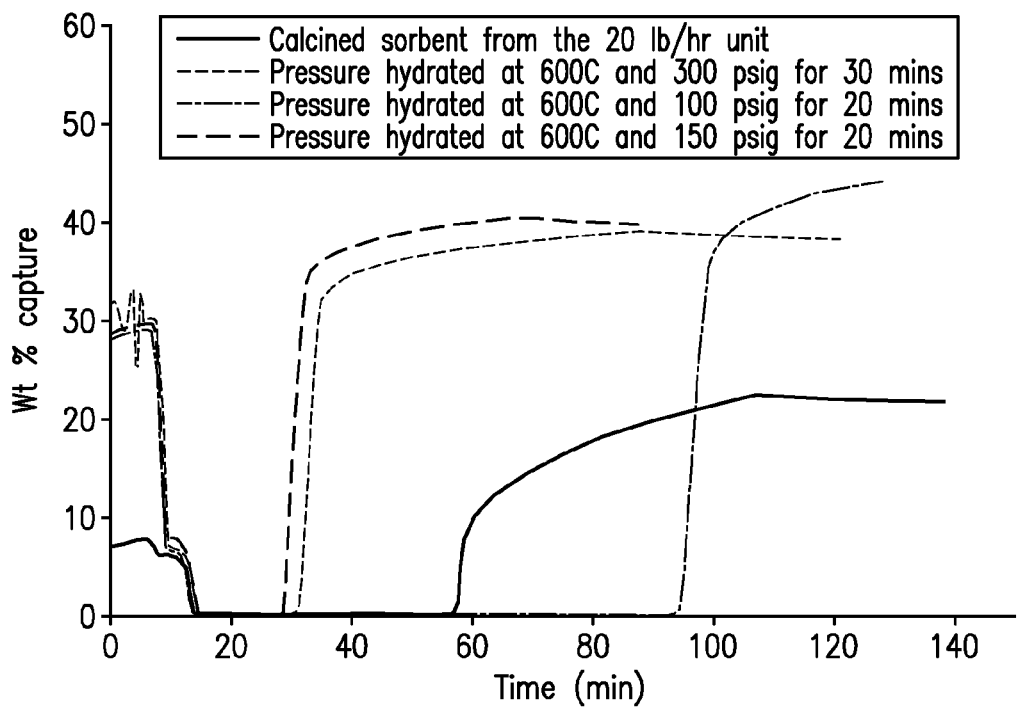
FIG. 21 illustrates the effect of pressure hydration on the capture capacity of the sorbent.

FIG. 21 shows the effect of pressure hydration at 600° C. for pressures ranging from 100 psig to 300 psig. It was found that the reactivity of the sorbent increases from 18% to 45% by pressure hydration at 600° C. and 100 psig. The reactivity of the sorbent was found to increase with the decrease in pressure although the extent of hydration remained the same at all pressures.

The CCR process for the removal of $CO_2$ from flue gas was also investigated in a subpilot plant scale demonstration. Single cycle experiments were conducted to determine the effect of process variables like calcium:carbon ratio, residence time, sorbent precursor. Cyclic carbonation calcination experiments were conducted to determine the effect of the number of cycles on the % $CO_2$ removal from the flue gas. Finally the effect of hydration after every calcination was also investigated on the % $CO_2$ capture.

Figure 22:
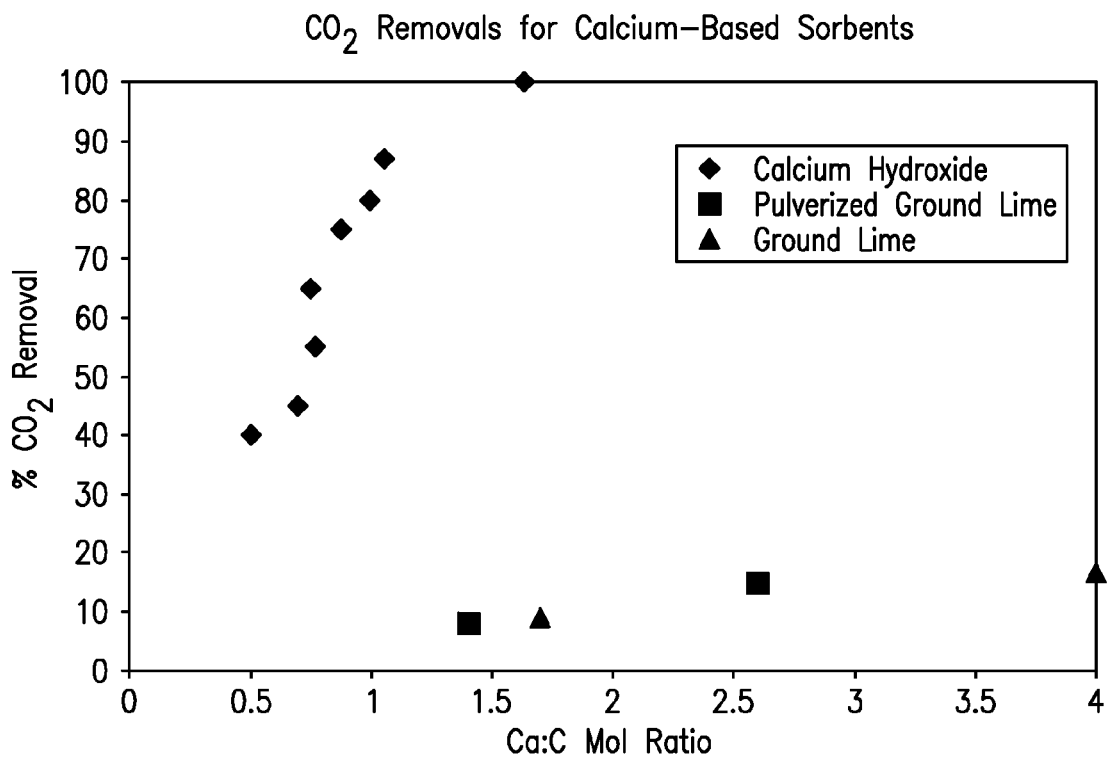
FIG. 22 illustrates the percent $CO_2$ removal versus Calcium:Carbon mol ratio for multiple sorbents.

FIG. 22 shows the effect of Calcium:Carbon mol ratio on carbon dioxide removal for multiple sorbents on a once-through basis. Commercial-grade calcium hydroxide clearly outperforms the commercial-grade lime in removing carbon dioxide from a coal-combustion flue gas stream. At a calcium:carbon mol ratio of approximately 1.7, virtually all $CO_2$ can be removed using calcium hydroxide.

Figure 23:
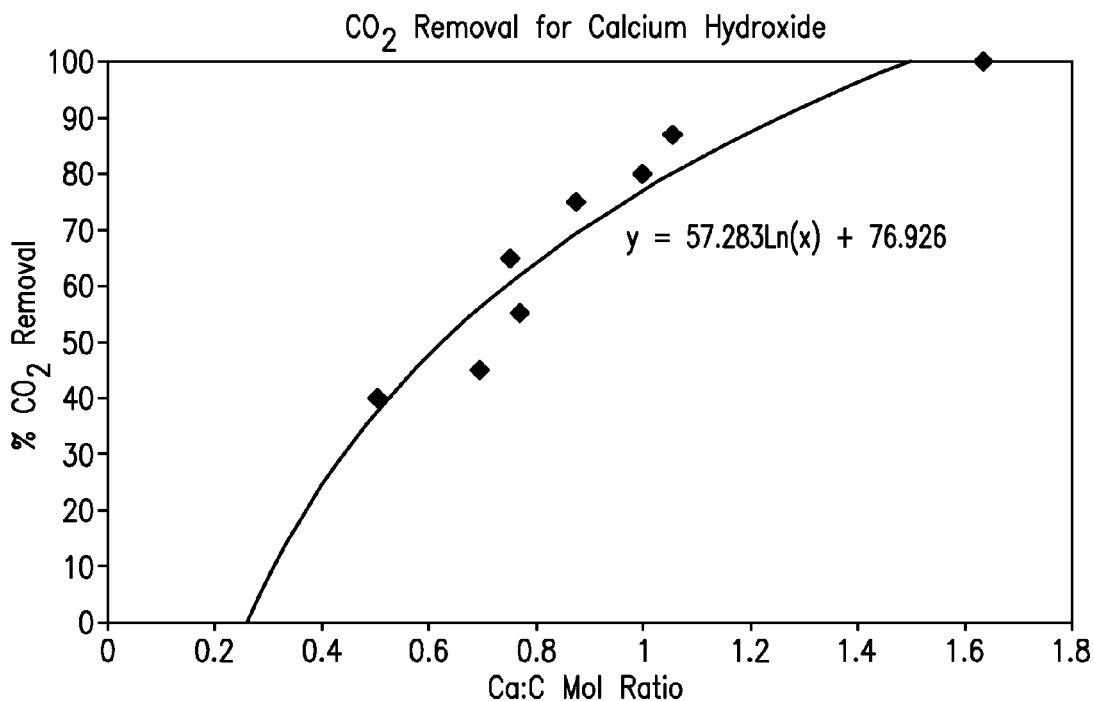
FIG. 23 illustrates the percent of $CO_2$ removed versus Calcium:Carbon mol ratio for calcium hydroxide, with fitted regression line.

FIG. 23 shows the percent of $CO_2$ removed from a coal-combustion flue gas stream for calcium hydroxide and provides a logarithmic relationship between the $CO_2$ removed and the calcium:carbon mol ratio with a high-degree of correlation. Approximately 1.5:1 Calcium:Carbon mol ratio would be required for complete $CO_2$ removal, according to the regression equation.

Figure 24:
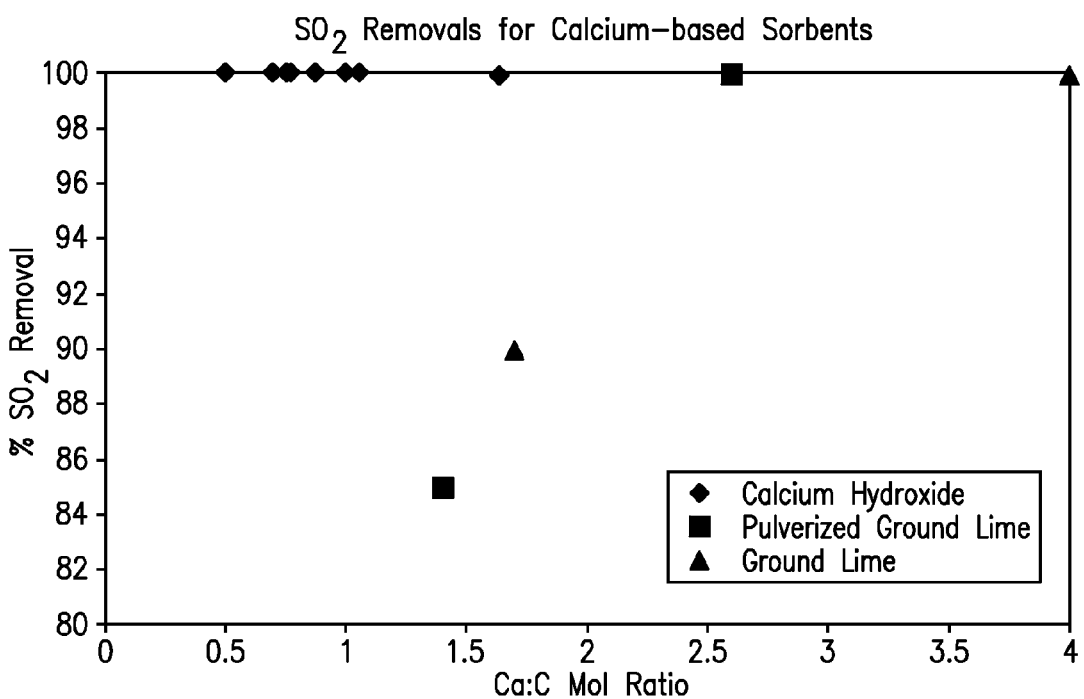
FIG. 24 illustrates sulfur dioxide removals as a function of calcium:carbon mol ratio for multiple calcium-based sorbents.

FIG. 24 shows the removal of sulfur dioxide from the flue gas stream for multiple sorbents and calcium:carbon ratios. For calcium hydroxide, the $SO_2$ removal is independent of the calcium:carbon mol ratio due to calcium hydroxide's high degree of reactivity. Moreover, since the sulfur content of coal is significantly lower than the carbon content of coal, the calcium:sulfur ratio will always be greater. For example, if a coal has 75% carbon and 5% sulfur, a 1:1 calcium:carbon mol ratio would be equivalent to a 40:1 calcium:sulfur ratio. This allows even the commercial-grade lime, which had poor $CO_2$ removals, to remove sulfur dioxide to a high degree at modest calcium:carbon ratios. FIG. 24 is obtained for single-cycle studies; however, complete $SO_2$ removal has been obtained for multiple cycles.

Figure 25:
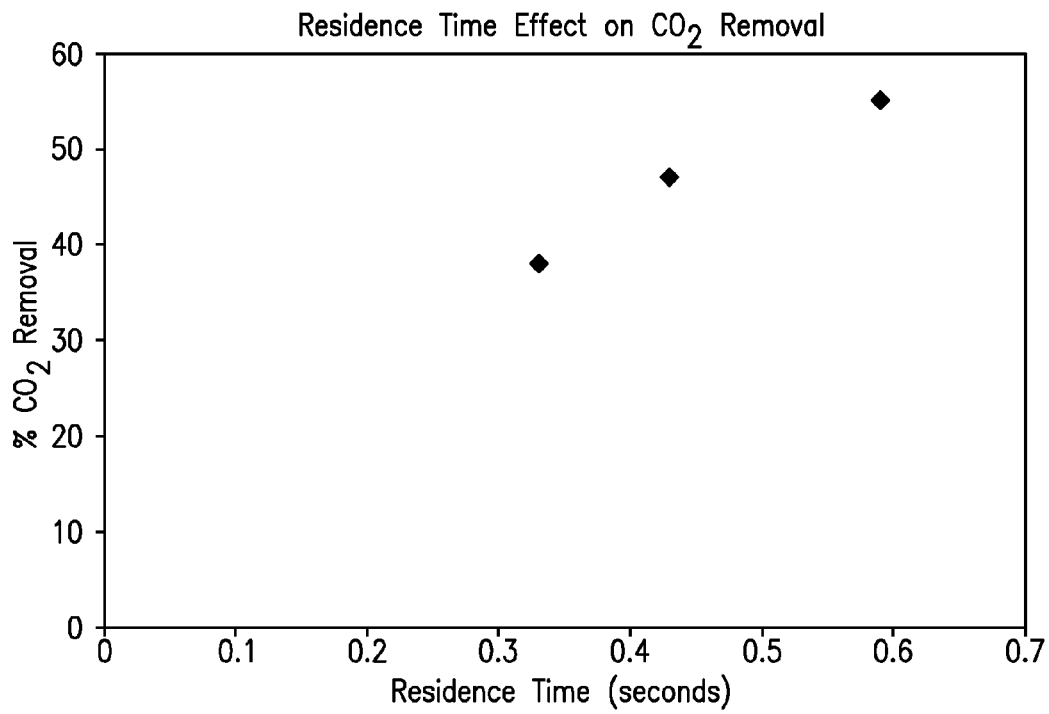
FIG. 25 illustrates the effect of residence time on $CO_2$ removal.

Finally, it is important to note the effect of residence time on the $CO_2$ removal. In the entrained bed reactor set-up, the residence time was varied between 0.3 and 0.6 seconds, while maintaining a constant calcium:carbon mol ratio. The results are shown in FIG. 25. Clearly, increasing the residence time increases the $CO_2$ removed.

Figure 26:
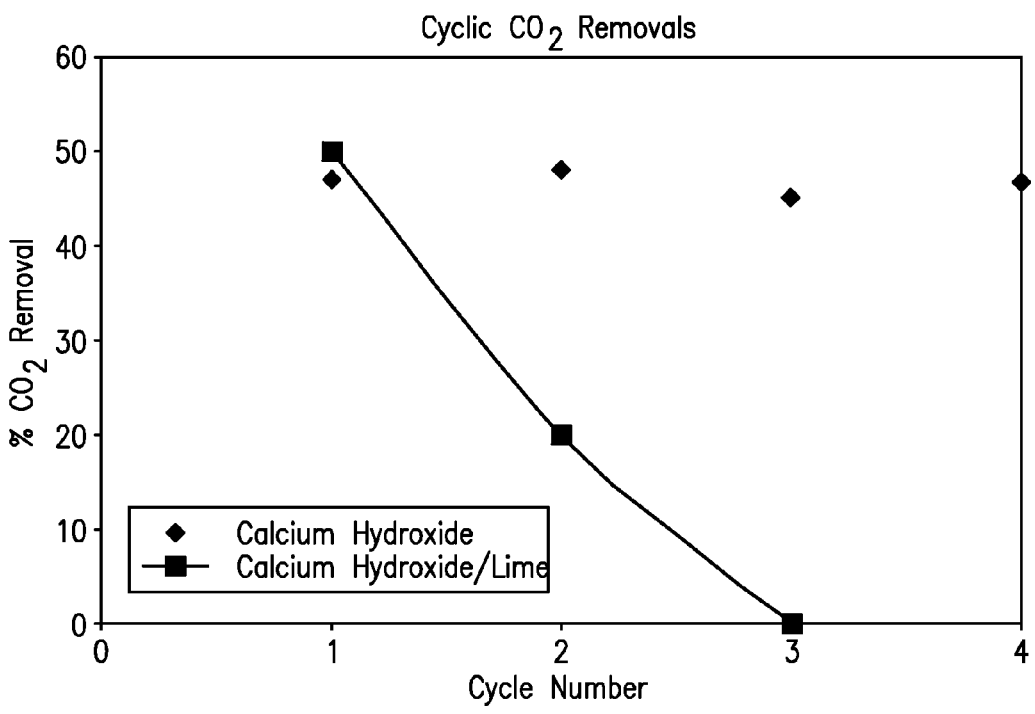
FIG. 26 illustrates $CO_2$ removal versus cycle number for calcium hydroxide and lime.

FIG. 26 shows the results from the cyclic studies. The calcium:carbon mol ratio was kept constant, with a value around 0.65. The calcium hydroxide sorbent with hydration during every cycle maintained its reactivity over the course of 4 cycles, with no indication of loss of reactivity. This shows that hydration completely reactivates the sorbent and reverses the effect of sintering. For the calcium hydroxide/lime cycles, the initial sorbent in the first cycle was calcium hydroxide. However, the calcium hydroxide was not regenerated, and the calcium carbonate formed in the carbonation reaction was calcined to form calcium oxide. The calcium oxide was then carbonated, and the cycle repeated. Clearly, without the calcium hydroxide sorbent formation, carbon dioxide capture decreases dramatically.

Figure 27:
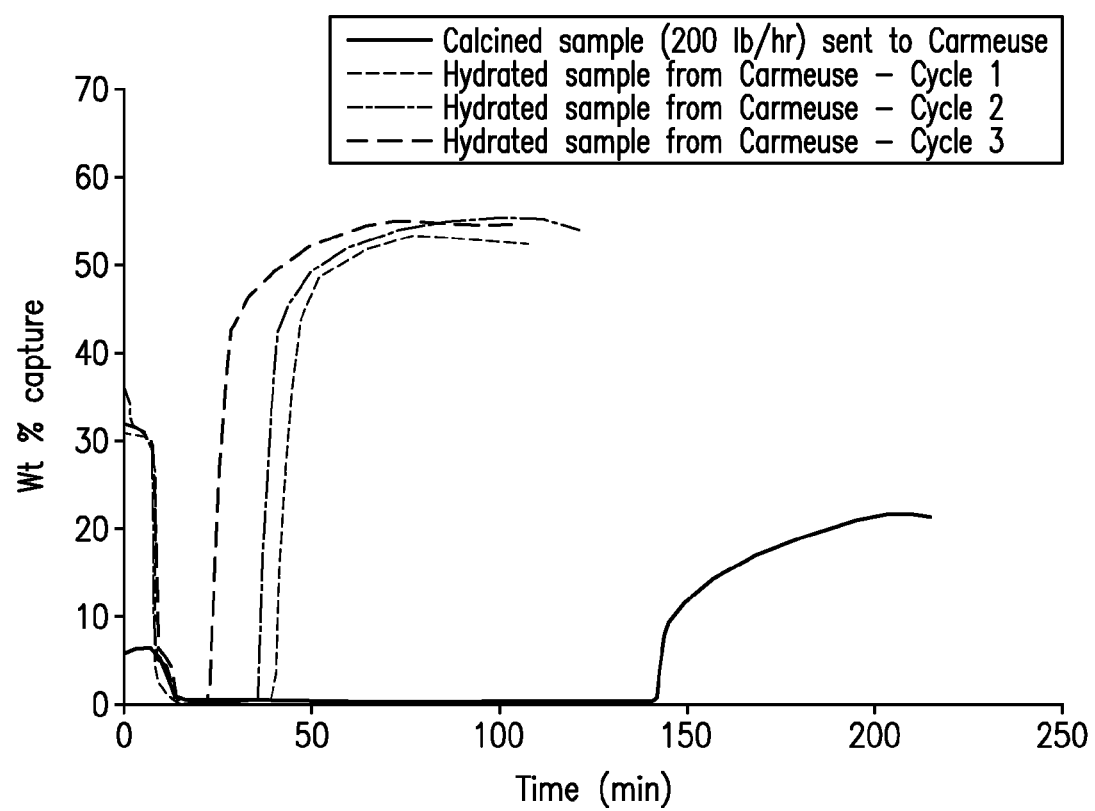
FIG. 27 illustrates multi-cyclic $CO_2$ capture capacity for Atmospheric Hydration and Pressure Hydration.

FIG. 27 shows the reactivity of the sorbent for multicyclic $CO_2$ capture with hydration for which the % $CO_2$ removal is illustrated in FIG. 26. Calcination in the subpilot plant kiln reduces the $CO_2$ capture capacity of the sorbent from 55% (12.5 moles/Kg CaO) to 20% (4.54 moles/Kg CaO). The subsequent hydration of the sorbent at the Carmeuse Limestone company facility resulted in the increase in the capture capacity of the sorbent back to 55% (12.5 moles/Kg CaO). Three cycles of carbonation and calcination at OSU and hydration at Carmeuse Limestone Company have been conducted and the $CO_2$ capture capacity has remained constant at 55% (12.5 moles/Kg CaO). Hence the regenerability of the sorbent due to hydration has been validated at the lab, bench and sub-pilot scale.

Having shown and described exemplary embodiments, those skilled in the art will realize that many variations and modifications may be made within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A method of eliminating carbon emissions by integrating a carbonation-calcination process in a conventional coal fired power plant, comprising:
   drawing a flue gas into a first particle collection device, said first particle capture device removing a portion of ash from said cooled flue gas creating a separated flue gas;
   directing said separated flue gas into a carbonator;
   removing $CO_2$ and $SO_2$ from said separated flue gas;
   separating a gas-solid mixture from said carbonator in a second particle capture device to form a lean-$CO_2$ flue gas and a solid stream;
   preheating air for combustion using said lean-$CO_2$ flue gas;
   mixing said solid stream with a fresh sorbent to create a sorbent mixture;
   calcining said sorbent mixture forming a calcined sorbent mixture;
   directing said calcined sorbent mixture to a third particle capture device to form a concentrated $CO_2$ stream and a sorbent stream, said sorbent stream is directed to a hydrator and said concentrated $CO_2$ stream is directed to a heat-exchanger;
   drawing steam from a turbine into said heat exchanger;
   preheating said steam in said heat exchanger to form preheated steam;
   directing said preheated steam to said hydrator;
   hydrating said sorbent stream in said hydrator to form hydrated solids; and
   directing said hydrated solids to said carbonator to interact with said separated flue gas.

2. The method of claim 1 further comprising hydrating said sorbent at pressures between about 1 bar and about 6 bar.

3. The method of claim 1 further comprising hydrating said sorbent at temperatures of between about 300° C. and about 600° C.

4. The method of claim 1 further comprising calcining said sorbent mixture at temperatures above about 850° C.

5. The method of claim 1 further comprising operating said second particle capture device at approximately the same temperature as said carbonator.

6. The method of claim 1 further comprising sequestering said concentrated $CO_2$ stream.

7. The method of claim 1 further comprising purging said solid stream to prevent the accumulation of inerts.

8. The method of claim 1 wherein said calciner is fired using fuel and high-purity oxygen.

9. The method of claim 1 wherein said flue gas is drawn post-economizer.

10. The method of claim 1 wherein said flue gas is drawn post-SCR.

11. The method of claim 1 further comprising directing exothermic heat from said hydrator to said turbine for the production of electricity.

12. The method of claim 1 wherein said flue gas is drawn from the boiler.

13. The method of claim 1 wherein said carbonator operates in a range from about 500° C. to about 700° C.

14. A method of eliminating carbon emissions by integrating a carbonation-calcination process in a conventional coal fired power plant, comprising:
    drawing a flue gas into a first particle collection device so as to produce a separated flue gas;
    directing said separated flue gas into a carbonator;
    removing $CO_2$ and $SO_2$ from said separated flue gas;
    separating a gas-solid mixture from said carbonator in a second particle capture device to form a lean-$CO_2$ flue gas and a solid stream, said lean-$CO_2$ flue gas used to preheat air for combustion;
    mixing said solid stream with a fresh sorbent to create a sorbent mixture;
    calcining said sorbent mixture forming a calcined sorbent mixture;
    directing said calcined sorbent mixture to a third particle capture device to for a concentrated $CO_2$ stream and a sorbent stream, said sorbent stream is directed to a hydrator and said concentrated $CO_2$ stream is directed to a heat-exchanger;
    drawing steam into said heat exchanger;
    preheating said steam in said heat exchanger to form preheated steam;
    directing said preheated steam to said hydrator;
    hydrating said sorbent stream in said hydrator to form hydrated solids; and
    directing said hydrated solids to said carbonator to interact with said separated flue gas.

15. The method of claim 14 further comprising hydrating said sorbent at pressures between about 1 bar and about 6 bar.

16. The method of claim 14 further comprising directing exothermic heat from said hydrator to said turbine for the production of electricity.

17. The method of claim 14 wherein said flue gas is drawn post-SCR.

18. A energy efficient sorbent reactivation system, comprising:
    a sorbent including a metal oxide;
    two concentric cylindrical reactors including an inner reactor and an outer reactor, the inner reactor is a pressurized vessel adapted to receive steam and a metal oxide, the inner reactor hydrates the metal oxide to form a metal hydroxide;
    a gravity feed wherein the hydrated metal hydroxide is fed from the inner reactor to the outer reactor; the outer reactor adapted to dehydrate the metal hydroxide to form a metal oxide, wherein said inner reactor is adapted to transfer exothermic heat generated from hydration to supply the outer reactor with the energy required to for the dehydration reaction; and
    a carbonator adapted to receive the dehydrated metal oxide from the outer reactor.

19. The sorbent reactivation system of claim 18, wherein the sorbent reactivation system is integrated into a conventional coal fired power plant.

20. The sorbent reactivation system of claim 18, wherein the inner reactor hydrates the metal oxide at pressures above 6 bar and at a temperature of about 600° F. to form a metal hydroxide and said outer reactor operates at ambient pressure and at a temperature of about 600° F. to form a metal oxide.

* * * * *